United States Patent
Farkas et al.

(10) Patent No.: US 10,193,941 B2
(45) Date of Patent: Jan. 29, 2019

(54) INTERWORKING BETWEEN FIRST PROTOCOL ENTITY OF STREAM RESERVATION PROTOCOL AND SECOND PROTOCOL ENTITY OF ROUTING PROTOCOL

(71) Applicant: TELEFONAKTIEBOLAGET L M ERICSSON (PUBL), Stockholm (SE)

(72) Inventors: János Farkas, Kecskemét (HU); András Kern, Budapest (HU)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 229 days.

(21) Appl. No.: 14/904,304

(22) PCT Filed: Jul. 14, 2014

(86) PCT No.: PCT/EP2014/065043
§ 371 (c)(1),
(2) Date: Jan. 11, 2016

(87) PCT Pub. No.: WO2015/004287
PCT Pub. Date: Jan. 15, 2015

(65) Prior Publication Data
US 2016/0149979 A1      May 26, 2016

Related U.S. Application Data

(60) Provisional application No. 61/845,512, filed on Jul. 12, 2013.

(51) Int. Cl.
*G06F 15/173* (2006.01)
*H04L 29/06* (2006.01)
(Continued)

(52) U.S. Cl.
CPC .......... *H04L 65/4069* (2013.01); *H04L 45/12* (2013.01); *H04L 47/70* (2013.01);
(Continued)

(58) Field of Classification Search
CPC ..... H04L 65/601; H04L 65/607; H04L 45/12; H04L 65/1069
See application file for complete search history.

(56) References Cited

U.S. PATENT DOCUMENTS 8,060,615 B2   11/2011 Finn
2006/0146696 A1* 7/2006 Li ........................ H04L 41/06
                                              370/218
(Continued)

FOREIGN PATENT DOCUMENTS

| CN | 101170477 A | 4/2008 |
| CN | 101779198 A | 7/2010 |
| CN | 102907051 A | 1/2013 |

(Continued)

OTHER PUBLICATIONS

International Search Report and Written Opinion issued by the ISA in International application No. PCT/EP2014/065043 dated Oct. 23, 2014, 14 pages.

(Continued)

*Primary Examiner* — Padma Mundur
(74) *Attorney, Agent, or Firm* — Rothwell, Figg, Ernst & Manbeck, p.c.

(57) ABSTRACT

A method for interworking between a first protocol entity adapted to operate in accordance with a stream reservation protocol for reserving resources for a data stream along a stream path of the data stream and a second protocol entity adapted to operate in accordance with a routing protocol for distributing information in a communication network is described. The method comprises sending, from the first protocol entity to the second protocol entity, a request for stream path information indicating, for a data stream to be sent, a stream path in the communication network. The method also comprises determining, by the second protocol entity, the stream path information for the stream path based on the request, sending, from the second protocol entity to the first protocol entity, the determined stream path infor- (Continued)

mation, and initiating, by the first protocol entity, a resource reservation procedure for reserving resources in response to receiving the stream path information.

26 Claims, 23 Drawing Sheets

(51) Int. Cl.
    H04L 12/721        (2013.01)
    H04L 12/911        (2013.01)
(52) U.S. Cl.
    CPC .......... H04L 65/601 (2013.01); H04L 65/607 (2013.01); H04L 65/1069 (2013.01)

(56) References Cited

U.S. PATENT DOCUMENTS

| | | | | |
|---|---|---|---|---|
| 2007/0208874 A1* | 9/2007 | Previdi | ............... | H04L 67/1008 709/238 |
| 2008/0285459 A1* | 11/2008 | Diab | ................... | H04L 12/2805 370/238 |
| 2009/0049175 A1* | 2/2009 | Finn | ...................... | H04L 12/462 709/226 |
| 2016/0014044 A1* | 1/2016 | Mangin | ................. | H04L 47/724 370/329 |

OTHER PUBLICATIONS

Farkas, János et al. "802.1Qca—PCR A Proposal," XP055146522, dated Jan. 15, 2013, 27 pages.
Bragg, Nigel, "The role of IS-IS in a PCR system," IEEE draft, XP068045933, dated Jan. 15, 2013, 38 pages.
"Media Access Control (MAC) Bridges and Virtual Bridged Local Area Networks—Amendment: Path Control and Reservations," IEEE P802.1Qca/D0.1, dated May 15, 2013, 22 pages.
Farkas, János, "SRP—IS-IS Interworking," XP055146455, dated Jul. 16, 2013, 26 pages.
International Preliminary Report on Patentability issued in corresponding International application No. PCT/EP2014/065043, dated Oct. 14, 2015, 21 pages.
"Media Access Control (MAC) Bridges and Virtual Bridged Local Area Networks Amendment: Stream Reservation Protocol (SRP) Enhancements and Performance Improvements," IEEE P802.1Qcc/D0.0, dated Aug. 29, 2013, 32 pages.
Chinese Office Action with Search Report issued in Chinese Application No. 201480050312.1 dated Apr. 27, 2018, 10 pages. (with English Summary).

* cited by examiner

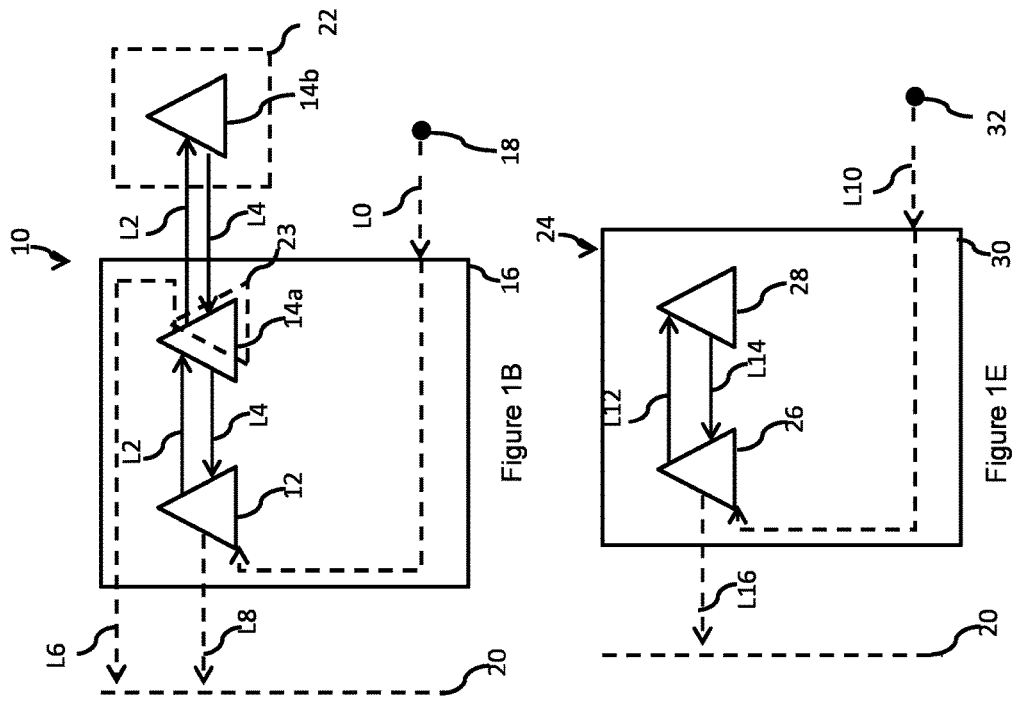
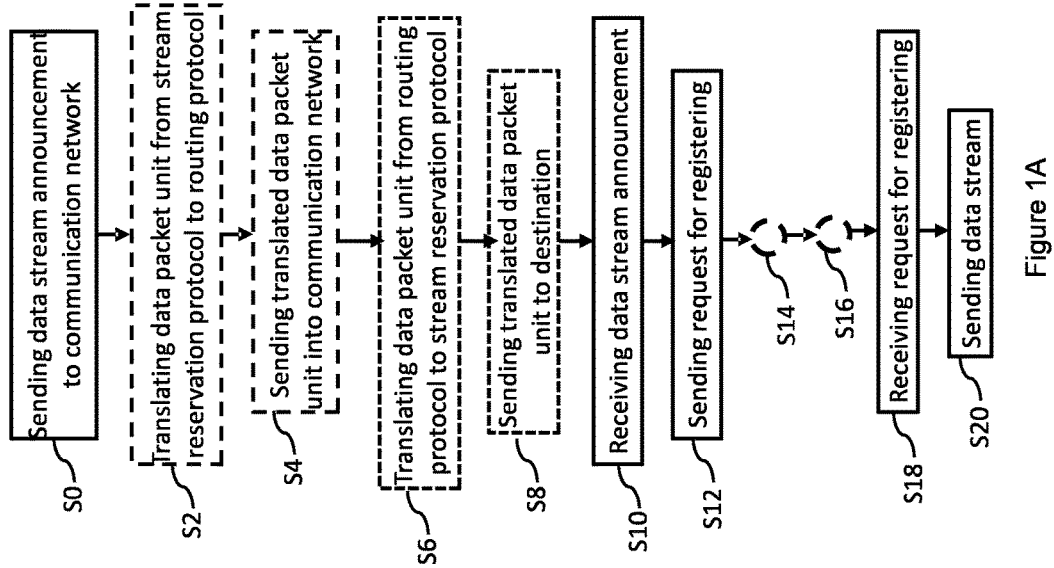

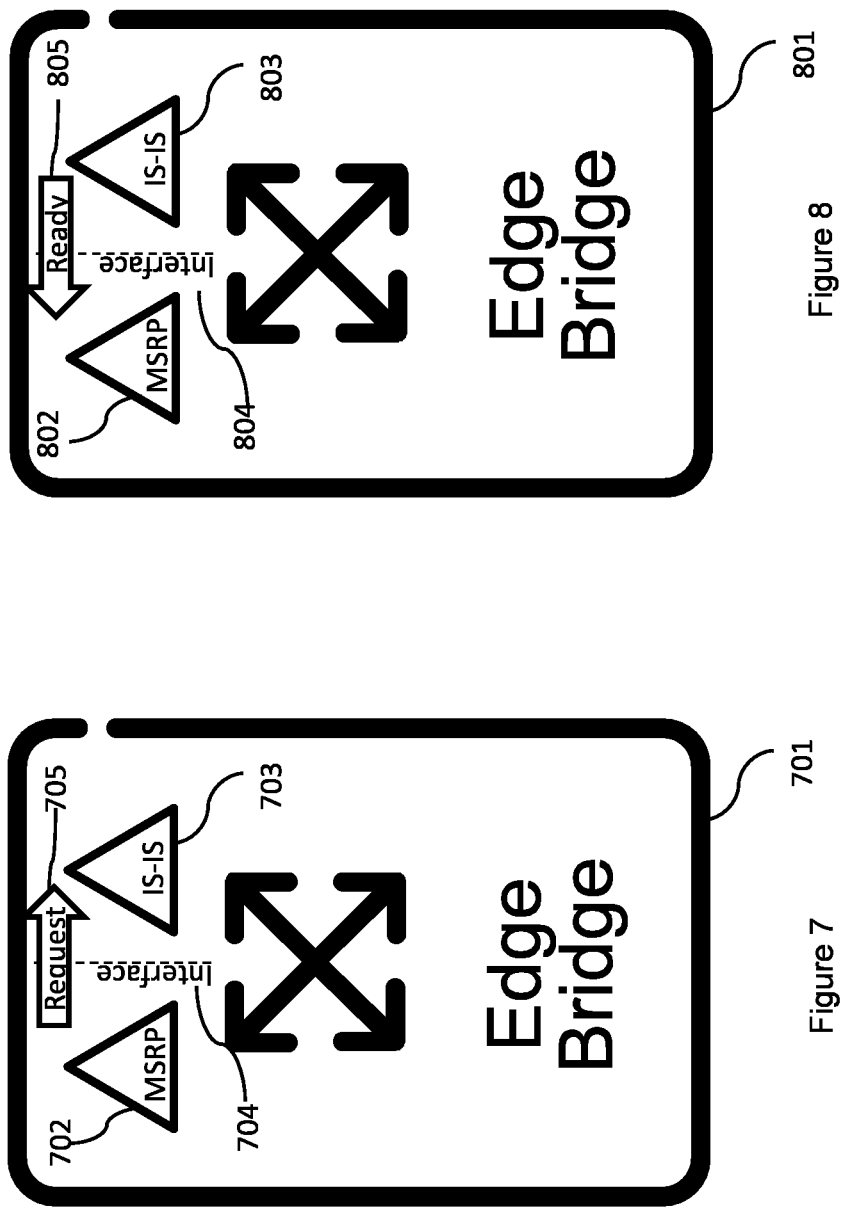

INTERWORKING BETWEEN FIRST PROTOCOL ENTITY OF STREAM RESERVATION PROTOCOL AND SECOND PROTOCOL ENTITY OF ROUTING PROTOCOL

CROSS REFERENCE TO RELATED APPLICATION(S)

This application is a 35 U.S.C. § 371 National Phase Entry Application from PCT/EP2014/065043, filed Jul. 14, 2014, which claims priority to U.S. Application No. 61/845,512, filed Jul. 12, 2013. The above identified applications are incorporated by reference.

TECHNICAL FIELD

The present disclosure relates to interworking between a first protocol entity of a stream reservation protocol and a second protocol entity of a routing protocol and a provision of a data stream from a source to a destination. Respective methods, systems, network nodes, communication systems, computer programs and computer program products are described.

BACKGROUND

For example in industrial applications such as controlling robots, in automotive applications such as passenger entainainments systems, or in other entainment applications such as a concert hall or a stadium, a data stream is provided from a source to at least one destination via a communication network. In this respect, the term "data stream" may denote an unidirectional flow of data, for example audio and/or videodata, from the source to one or more destinations. The term "source" may denote an end station which may be a producer of the data stream, and the source can also be denoted as a Talker. The term "desination" may denote an end station which may receive or consume a data stream, and the destination may also be denoted as a Listener.

In the above applications, the source announces a provision of a data stream. Then at least one destination registers for receiving the data stream, and a communication network intermediate the source and the destination ensures the transport of the data stream from the source to the at least one destination while meeting stream requirements concerning for example quality of service and bandwidth. The data stream may be usually time sensitive in that strict time requirements have to be met to properly transport the data stream from the source to the at least one destination. Further, the communication network may be embodied as a bridged network or bridge network in which multiple hops and links are present between respective edge nodes to which the source and destination may be adjacent. It is noted that the terms "bridge network" and "bridged network" can be used in this application in an interchangable way.

The Multiple Stream Reservation Protocol (MSRP) is a protocol designed to provide Quality of Service (QoS) for streams in such a bridged network by means of reserving resources within each bridge along the stream path of the data stream. The MSRP operation is based on exchanging Multiple Stream Registration Protocol Data Units (MSRP-DUs). The operation of MSRP is specified by IEEE 802.1Q-2011. A project called IEEE P802.1Qcc is initiated and aims for specifying extensions and enhancements to the Stream Reservation Protocol (SRP), thus for specifying MSRP. Reference for P802.1Qcc Stream Reservation Protocol (SRP) Enhancements and Performance Improvements is made to http://www.ieee802.org/1/pages/802.1cc.html.

Further, Intermediate System to Intermediate System (IS-IS) has been introduced by the IEEE 802.1aq Shortest Path Bridging (SPB) specification for bridge networks. Further IS-IS extensions for a bridge network are currently being specified by an ongoing IEEE 802.1Qca Path Control and Reservation (PCR) project, in order to provide further capabilities, for example capabilities which are beyond a shortest path utilization. Reference for P802.1Qca Path Control and Reservation is made to http://www.ieee802.org/1/pages/802.1ca.html.

Stream Reservation Protocol (SRP) is specified for Rapid Spanning Tree Protocol (RSTP) and Multipe Spanning Tree Protocol (MSTP) networks. Therefore, SRP cannot leverage the capabilities provided by IS-IS, for example shortest path. The latter may be due to the fact that RSTP and MSTP might not support of functionalities of SPB of SRP. Even the interworking of the old Generation 1 SRP and IS-IS is not clearly specified. Further, Generation 2 SRP will have new features, so as IS-IS with the Qca extension, for example the capability of setting up explicit paths which may be not the shortest path thus may provide disjoint paths for the protection of a given stream. The interworking of SRP and IS-IS is a missing piece. A method for this interworking has to be provided, in order to leverage the features provided by IS-IS for time-sensitive streams as well.

To sum up, SRP was specified for bridge networks controlled by RSTP or MSTP. Nevertheless, RSTP and MSTP have some characteristics that are undesirable for the streams, for example RSTP and MSTP do not support an efficient setut-up of a shortest path in a bridge network. Furthermore, the introduction of IS-IS into bridge networks by Shortest Path Bridging (SPB) and the on-going IEEE P802.1Qca Path Control and Reservation (PCR) project open up new possibilities both for the existing SRP and the next version (Generation 2, Gen2) that will be specified by the IEEE P802.1Qcc project. However, a method for interworking between SRP and IS-IS is needed for leveraging the potential capabilities of IS-IS, for example, in a bridge communication network, which method may represent a missing piece.

SUMMARY

It is an object of the invention to provide measures with which an easy and efficient interworking between different protocol entities with respect to stream path establishment and resources reservation can be performed. It is also an object to provide measures with which a data stream can be provided in an easy and efficient way between a source and a destination. It is also an object to provide corresponding methods, systems, network nodes, communication systems, computer programs, and computer program products.

The objects defined above are solved by the independent claims. Further embodiments are described in the dependent claims.

According to a first embodiment, a method for interworking between a first protocol entity adapted to operate in accordance with a stream reservation protocol for reserving resources for a data stream along a stream path of the data stream and a second protocol entity adapted to operate in accordance with a routing protocol for distributing information in a communication network is provided. The method comprises sending, from the first protocol entity to the second protocol entity, a request for stream path information indicating, for a data stream to be sent, a stream path in the communication network, and determining, by the second protocol entity, the stream path information for the stream path based on the request. The method comprises sending, from the second protocol entity to the first protocol entity, the determined stream path information, and initiating, by the first protocol entity, a resource reservation procedure for reserving resources in response to receiving the stream path information.

According to a second embodiment, a method for interworking between a first protocol entity adapted to operate in accordance with a stream reservation protocol for reserving resources for a data stream along a stream path of the data stream and a second protocol entity adapted to operate in accordance with a routing protocol for distributing information in a communication network is provided. The method comprises sending, from the first protocol entity to the second protocol entity, a request for stream path information indicating, for a data stream to be sent, a portion of a stream path in the communication network, determining, by the second protocol entity, stream path information indicating the portion of the stream path, and sending, from the second protocol entity to the first protocol entity, the determined stream path information.

According to a third embodiment, a method for sending a data stream from a source of the data stream to a destination of the data stream is provided. The method comprises sending, by the source, a data stream announcement to a communication network, and sending, by the destination, a request for registering in receiving the data stream from the source to a first protocol entity adapted to operate in accordance with a stream reservation protocol for reserving resources for the data stream along a stream path of the data stream based on the received data stream announcement. The method further comprises a method according to the first embodiment, and sending the data stream from the source to the destination using reserved resources in accordance with an initiated resource reservation procedure.

According to a fourth embodiment, a method for sending a data stream from a source of the data stream to a destination of the data stream is provided. The method comprises sending, by the source, a data stream announcement to a communication network, and sending, by the destination, a request for registering in receiving the data stream from the source to a network node based on the received data stream announcement. The method further comprises a method according to the second embodiment, and sending the data stream from the source to the destination based on determined stream path information.

According to a fifth embodiment, a method to be used in association with sending a data stream from a source of the data stream to a destination of the data stream is provided. The method comprises receiving a request for registering in receiving the data stream from the source in a protocol data unit according to a stream reservation protocol for reserving resources for the data stream along a stream path of the data stream, and determining stream path information in response to the received request. The stream path information indicates, for the data stream to be sent, a stream path in a communication network. The method comprises sending the determined stream path information, particularly an identification of the stream path and/or a stream path description describing the stream path, in a protocol data unit according to a routing protocol for distributing information in the communication network or sending the determined stream path information, particularly the stream path description, in a protocol data unit according to the stream reservation protocol.

According to a sixth embodiment, a method to be used in association with sending a data stream from a source of the data stream to a destination of the data stream is provided. The method comprises receiving a stream path description describing a stream path of the data stream in a protocol data unit according to a stream reservation protocol for reserving resources for the data stream along the stream path, and determining stream path information based on the received stream path description. The stream path information indicates, for the data stream to be sent, a portion of the stream path in a communication network. The method comprises sending, in accordance with the determined stream path information, the stream path description in a protocol data unit according to the stream reservation protocol.

According to a seventh embodiment, a method for sending a data stream from a source of the data stream to a destination of the data stream is provided. The method comprises sending, by the source, a data stream announcement to a communication network, and sending the data stream announcement through at least a portion of the communication network in a data packet unit according to a stream reservation protocol for reserving resources for the data stream along a stream path of the data stream or a data packet according to a routing protocol for distributing information in the communication network. The method comprises sending, by the destination, a request for registering in receiving the data stream from the source to a network node based on the received data stream announcement, and sending the data stream from the source to the destination based on the request in registering in receiving the data stream.

According to an eighth embodiment, a system for interworking between a first protocol entity adapted to operate in accordance with a stream reservation protocol for reserving resources for a data stream along a stream path of the data stream and a second protocol entity adapted to operate in accordance with a routing protocol for distributing information in a communication network is provided. The system comprises the first protocol entity and the second protocol entity, and the system is adapted to send, from the first protocol entity to the second protocol entity, a request for stream path information indicating, for a data stream to be sent, a stream path in the communication network, and to determine, by the second protocol entity, the stream path information for the stream path based on the request. The system is adapted to send, from the second protocol entity to the first protocol entity, the determined stream path information, and to initiate, by the first protocol entity, a resource reservation procedure for reserving resources in response to receiving the stream path information.

According to a ninth embodiment, a system for interworking between a first protocol entity adapted to operate in accordance with a stream reservation protocol for reserving resources for a data stream along a stream path of the data stream and a second protocol entity adapted to operate in accordance with a routing protocol for distributing information in a communication network is provided. The system comprises the first protocol entity and the second protocol entity, and the system is adapted to send, from the first protocol entity to the second protocol entity, a request for stream path information indicating, for a data stream to be sent, a portion of a stream path in the communication network, and to determine, by the second protocol entity, stream path information indicating the portion of the stream path. The system is adapted to send, from the second protocol entity to the first protocol entity, the determined stream path information.

According to a tenth embodiment, a network node for interworking between a first protocol entity adapted to operate in accordance with a stream reservation protocol for reserving resources for a data stream along a stream path of the data stream and a second protocol entity adapted to operate in accordance with a routing protocol for distributing information in a communication network is provided. The network node comprises the system according to the eighth embodiment or the ninth embodiment.

According to an eleventh embodiment, a network node to be used in association with sending a data stream from a source of the data stream to a destination of the data stream is provided. The network node is adapted to receive a request for registering in receiving the data stream from the source in a protocol data unit according to a stream reservation protocol for reserving resources for the data stream along a stream path of the data stream, and to determine stream path information in response to the received request. The stream path information indicates, for the data stream to be sent, the stream path in a communication network. The network node is adapted to send the determined stream path information, particularly an identification of the stream path and/or a stream path description describing the stream path, in a protocol data unit according to a routing protocol for distributing information in the communication network or to send the determined stream path information, particularly the stream path description, in a protocol data unit according to the stream reservation protocol.

According to a twelfth embodiment, a network node to be used in association with sending a data stream from a source of the data stream to a destination of the data stream is provided. The network node is adapted to receive a stream path description describing a stream path of the data stream in a protocol data unit according to a stream reservation protocol for reserving resources for the data stream along the stream path, and to determine stream path information based on the received stream path description. The stream path information indicates, for the data stream to be sent, a portion of the stream path in a communication network. The network node is adapted to send, in accordance with the determined stream path information, the stream path description in a protocol data unit according to the stream reservation protocol.

According to a thirteenth embodiment, a communication system for sending a data stream from a source of the data stream to a destination of the data stream is provided. The communication system comprising at least one of the system according to the eighth embodiment and a system according to the ninth embodiment, a network node according to the tenth embodiment and/or at least one of a network node according to the eleventh embodiment and a network node according to the twelfth embodiment.

According to a fourteenth embodiment, a communication system for sending a data stream from a source of the data stream to a destination of the data stream is provided. The communication system comprises the source and the destination and a communication network. The communication system is adapted to send, by the source, a data stream announcement to the communication network, and to send, by the destination, a request for registering in receiving the data stream from the source to a first protocol entity adapted to operate in accordance with a stream reservation protocol along a stream path of the data stream based on the received data stream announcement. The communication system is further adapted to perform a method according to the first embodiment, and to send the data stream from the source to the destination using reserved resources in accordance with an initiated resource reservation procedure.

According to a fifteenth embodiment, a communication system for sending a data stream from a source of the data stream to a destination of the data stream is provided. The communication system comprises the source, the destination and a communication network. The communication system is adapted to send, by the source, a data stream announcement to the communication network, and to send, by the destination, a request for registering in receiving the data stream from the source to a network node based on the received data stream announcement. The communication system is further adapted to perform a method according to the second embodiment and to send the data stream from the source to the destination based on determined stream path information.

According to a sixteenth embodiment, a communication system for sending a data stream from a source of the data stream to a destination of the data stream is provided. The communication system comprises the source and the destination and a communication network. The communication system is adapted to send, by the source, a data stream announcement to the communication network, and to send the data stream announcement through at least a portion of the communication network in a data packet unit according to a stream reservation protocol for reserving resources for the data stream along a stream path of the data stream or a data packet according to a routing protocol for distributing information in the communication network. The communication system is adapted to send, by the destination, a request for registering in receiving the data stream from the source to a network node based on the received data stream announcement, and to send the data stream from the source to the destination based on the request in registering in receiving the data stream.

According to a seventeenth embodiment, a computer program is provided. The computer program, when being executed by at least one processor, causes a method according to at least one of the first to seventh embodiments to be performed.

According to an eighteenth embodiment, a computer program product is provided. The computer program product comprises program code to be executed by at least one processor, thereby causing a method according to at least one of the first to seventh embodiments to be performed.

The foregoing and other objects, features and advantages of the embodiments will become more apparent in the following detailed description of embodiments as illustrated in the accompanying drawings.

BRIEF DESCRIPTION OF THE DRAWINGS

FIG. 1A is a flow diagram illustrating a method for sending a data stream from a source of the data stream to a destination of the data stream according to an embodiment.

FIG. 1B is a block diagram illustrating a system according to an embodiment and a respective data flow to, from and within the system.

FIG. 1E is a block diagram illustrating a system according to an embodiment and a respective data flow to, from and within the system.

FIG. 7 is a block diagram illustrating a network node according to an embodiment, in which a MSRP application requests a path from an IS-IS application.

FIG. 8 is a block diagram illustrating a network node according to an embodiment, in which a stream path is ready to be used by the data stream.

DETAILED DESCRIPTION

Figure 1C:
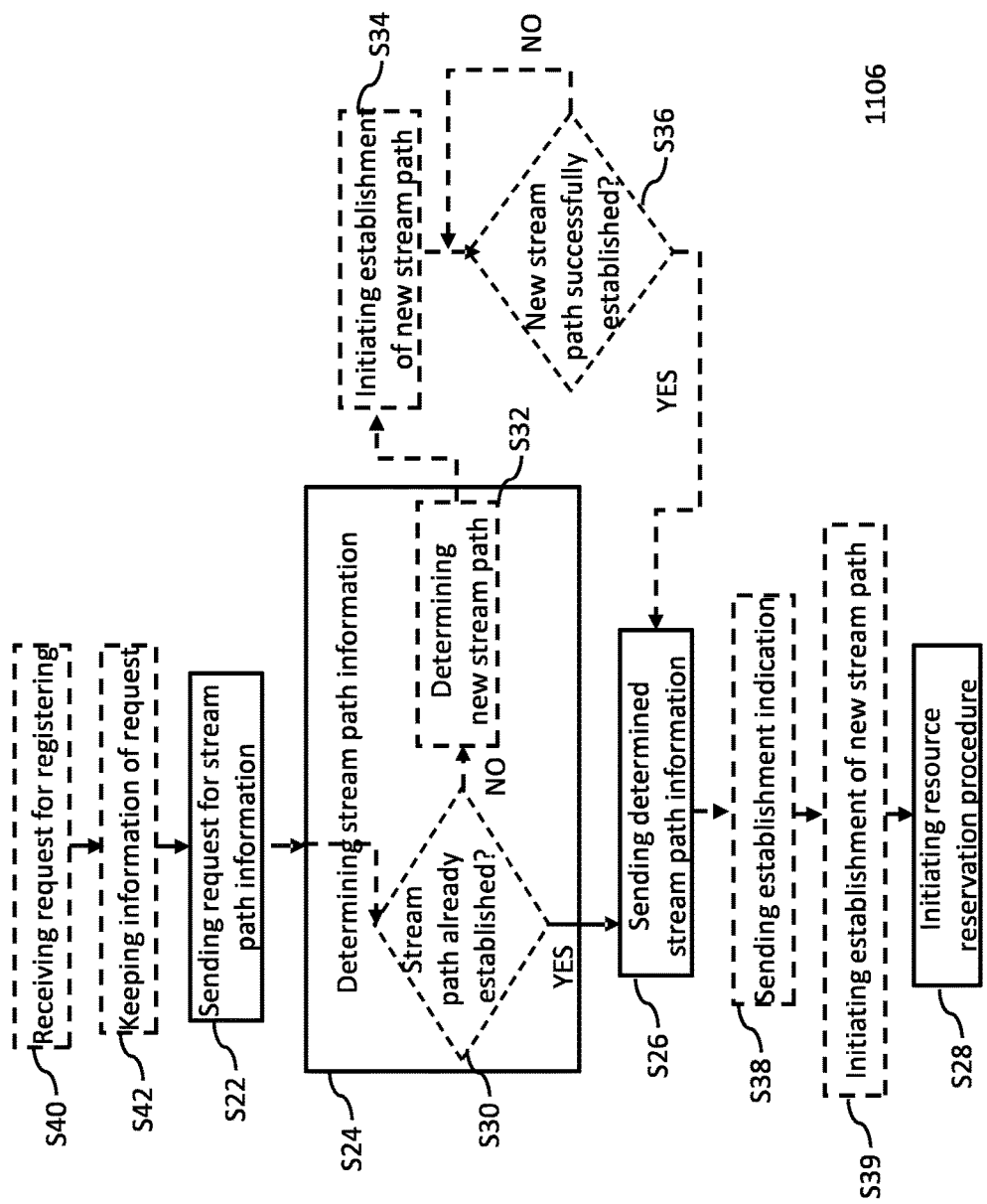
FIG. 1C is a flow diagram illustrating a method for interworking between a first protocol entity adapted to operate in accordance with a stream reservation protocol and a second protocol entity adapted to operate in accordance with a routing protocol according to an embodiment.

It is noted that the illustration in the drawings is schematic.

Within the context of this application, the terms defined in the section "Background" may also apply to the sections describing the embodiments.

The term "stream reservation protocol" may particularly denote a signaling protocol or control protocol which may provide a node, for example a source, a destination and/or a network node intermediate the source and the destination, with an ability to reserve network resources for example to ensure a quality of service between the source and the destination. The stream reservation protocol may further provide other abilities. Such a protocol may be embodied as, for example, a Stream Reservation Protocol (SRP) or a Multiple Stream Registration Protocol (MSRP).

The term "routing protocol" may particularly denote a signaling protocol or control protocol for distributing or moving information efficiently within a communication network. The latter may be, for example, accomplished by determining a best route to be used for a data packet unit or datagram through the communication network. The routing protocol may be embodied, for example, by an IS-IS protocol.

The term "data packet unit" may particularly denote a protocol data unit. In this respect, a data packet unit may relate to a basic data unit usable for data transfer in accordance with a protocol. Hence, a data packet unit may be embodied as or may comprise a protocol data unit. The latter may apply for the data packet units according to stream reservation protocol and/or the routing protocol.

In the following a communication scenario to which the present disclosure may be applied will be described.

A data stream may have to be provided from a source to a destination via or through a communication network. The communication network may be embodied as a cloud comprising multiple distributed network nodes. In this respect, the term "cloud" may refer to a communication network whose internal structure may be unknown or hidden to the source and/or destination. Hence the source and the destination may connect and communicate with adjacent network nodes of the communication network, respectively. The communication may be based on, for example, a stream reservation protocol usable between the source and the destination, respectively, and the adjacent network nodes and/or in the communication network. The stream reservation protocol may be utilized for or may enable reserving resources for a data stream along a stream path of the data stream, for example may enable the reservation of bandwidth etc, in or within the communication network. These network nodes may be called edge network nodes as the network nodes forming edges of the communication network. The communication network may further comprise intermediate or core network nodes between the edge network nodes. Communication within the communication network may be based on the stream reservation protocol and a routing protocol for distributing information in the communication network. Such information may relate to a stream path description to be used for establishment of a stream path of a data stream. In this respect, the network nodes in the communication network may comprise a first protocol entity adapted to operate in accordance with the stream reservation protocol and a second protocol entity adapted to operate in accordance with the routing protocol.

According to some embodiments, the stream reservation protocol may correspond to SRP or MRSP. The routing protocol may correspond to one of IS-IS, Transmission Control Protocol (TCP), and a Path Computation Element (PCE) Communication Protocol (PCEP) based protocol. It is to be understood that a data packet unit according to SRP or MSRP may be terminated at receipt by a network node and a corresponding new data packet unit according to SRP or MSRP may be generated and may be sent. A content of such a received data packet unit may be forwarded without alternation. It is also to be understood that a data packet unit according to IS-IS may be directly forwarded by a network node upon receipt without generation of a data packet unit according to IS-IS.

In the following, the embodiments of the invention will be explained in conjunction with the FIGS. 1A to 1G. It is noted that embodiments of the subject-matter of one independent claim (for example the method for interworking according to claim 1) may equally apply to the subject-matter of the other independent claims (for example the method for interworking according to claim 18, the methods according to claims 20, 22, 25 to 27, the systems according to claims 29 and 32, the network nodes according to claims 34 to 36, the communication systems according to claims 37 to 40, the computer program according to claims 41 and the computer program product according to claim 42). Optional elements and methods steps in the FIGS. 1A to 1G are indicated by dashed lines.

According to some embodiments, the source may send a data stream announcement in a step S0 to the communication network. The data stream announcement may be sent in a data packet unit according to the stream reservation protocol, for example in a MSRPDU in case of MSRP. The data stream announcement may be sent through the communication network to the destination.

At receipt of the data stream announcement by a network node adjacent to the source, the network node may forward the data stream announcement in a data packet unit according to the stream reservation protocol through at least a portion of the communication network. Alternatively, the network node may translate the received data packet unit in an optional step S2 from the stream reservation protocol to the routing protocol, for example from the MRSPDU into a LSP in case of IS-IS. Thereupon, the network node may send the translated data packet unit in an optional step S4 into the communication network for further distribution through at least a portion of the communication network. The data packet unit may be communicated to a further network node, particularly a network node adjacent to the destination of the data stream optionally via the at least one intermediate network node. At receipt of the data packet unit at the latter network node, the network node may forward the data stream announcement in a data packet unit according to the stream reservation protocol or may translate, in an optional step S6, the data packet unit from the routing protocol to the stream reservation protocol and may further send the translated data packet unit in an optional step S8 to the destination. Translation of the data packet unit may be performed using a respective first protocol entity of the respective network node and/or a second protocol entity of the respective network node. The aforementioned first protocol entity may be adapted to operate in accordance with the stream reservation protocol and the aforementioned second protocol entity may be adapted to operate in accordance with the routing protocol.

The latter description of translating may also apply for any intermediate network node between a network node adjacent to the source and the network node adjacent to the destination.

The destination may receive the data stream announcement in a step S10 and may send a request for registering in receiving the data stream from the source, for example a Listener Ready, in a step S12 to the network node adjacent to the destination based on the received data stream announcement. The request for registering may be sent in a data packet according to the stream reservation protocol, for example in a MSRPDU. In a further optional step S14, a method for interworking between a first protocol entity adapted to operate in accordance with the stream reservation protocol and a second network protocol entity adapted to operate in accordance with the routing protocol is performed, in order to accomplish stream path determination and initiation of a resource reservation procedure for reserving resources along a determined stream path and to accomplish optionally initiation of stream path establishment. The method may be performed by a system comprising the first protocol entity and the second protocol entity, such as the network node adjacent to the destination. This method may be explained further with reference to FIGS. 1B, 1C, 1D. Thereupon, in an optional step S16, a further method for interworking between a first protocol entity adapted to operate in accordance with the stream reservation protocol and a second protocol entity adapted to operate in accordance with the routing protocol may be performed. The method may be formed by a further system which comprises the first protocol entity and the second protocol entity and which may be comprised in or embodied as a further network node, for example an intermediate network node. The method will be explained in more detail with reference to FIGS. 1E, 1F, 1G. In a step S18, the request for registering is received in the step S18 by the source, and the source sends the data stream in the step S20 from the source to the destination based on the received request. The sending of the data stream may use all resources reserved in the communication network according to the resource reservation procedure or may use a portion of the reserved resources.

In the step S20, the data stream may be sent from the source to the destination at least along the stream path and optionally along one or more further different stream paths. Hence, the complete data stream path from the source to the destination may be embodied as a tree. For example, protection operations for the data stream, such as protection scheme based operations, can be performed, for example by the source, the destination and one or more network nodes in the communication network. In this respect, the term "protection operations" and in particular "protection scheme" may refer to measures for ensuring a correct provision or an identical provision of the data stream from the source to one or more destinations along more than one stream paths. The provision may be for example accomplished in a simultaneous way, for example by means of duplication of the data stream, or in a sequence, for example along one stream path and later along a further stream path.

In the step S20, the data stream may be sent from the source to at least a further destination. Hence, the complete stream path may be also embodied as a tree. Protection operations explained above may also be performed. The at least further destination may send a request for registering in receiving the data stream to the system, particularly the network node, or to another system or network node, in which a corresponding method of the step S14 is performed. Thereupon, a corresponding method described for the step S16 may be performed by the above system and intermediate network node, respectively, or a different system and intermediate network node, respectively.

FIG. 1B illustrates a system 10 implementing the method of the step S14 in FIG. 1A. The system 10 comprises the first protocol entity 12 and the second protocol entity 14a, 14b. In case of the stream reservation protocol being MSRP, the first protocol entity 12 may be embodied as MSRP entity. In case of the routing protocol being IS-IS protocol, the second protocol entity 14a, 14b may be embodied as IS-IS protocol entity. The first protocol entity 12 and/or the second protocol entity 14a, 14b may be adapted as an application. In one embodiment, the first protocol entity 12 and the second protocol entity 12, 14a are part of a network node 16 adjacent to the destination 18 and therefore of the communication network 20. In a further embodiment, the first protocol entity 12 is part of the network node 16 and the second protocol entity 14b is part of a communication entity 22 which is external of the network node 16. The communication entity 22 may be, for example, a central controller adapted to control the communication network 20. The external protocol entity 14b may be part of the Qca extensions and/or may implement functionalities related to a Path Computation Entity (PCE). The second protocol entity 14b, particularly the communication entity 22 may be connected (only) to a (single) network node of the communication network and optionally to one further second network node of the communication network, for example for communication fallback. In this further embodiment, the network node 16 may comprise a further protocol entity 23 adapted to operate in accordance with the routing protocol, wherein the further protocol entity 23 and the second protocol entity 14b of the communication entity 22 may be adapted to communicate with each other via the routing protocol. The stream reservation protocol and the routing protocol form a protocol stack in the network node 16. Implementing the system 10 with the first protocol entity 12 and the second protocol entity 14a in the network node 16 may allow for an fast interworking solution with respect to determination of the stream path information and initiation of the resource reservation procedure, such that time sensitive data streams may be received without delay. In particular, an establishment of the stream path may be also facilitated. On the contrary, implementing the system 10 with the first protocol entity 12 and the second protocol entity 14b may allow for a resource-saving implementation of the network node 16 and a centralized stream path information determination by the further entity 22.

As illustrated in FIG. 10, the first protocol entity 12 sends a request for stream path information indicating, for the data stream to be sent, a stream path in the communication network 20 in a step S22 to the second protocol entity 14a, 14b. Thereupon, in a step S24, the second protocol entity 14a, 14b determines the stream path information for the stream path based on the received request, and sends, in a step S26, the determined stream path information to the first protocol entity 12. In a further step S28, the first protocol entity 12 initiates a resource reservation procedure for reserving resources in response to receiving the stream path information. It is noted that in the FIG. 1B the dashed arrows extend between the first protocol entity 12 and the second protocol entity 14b. Accordingly, an easy and efficient interworking between the protocol entities 12, 14a, 14b may be enabled, since both protocols can directly interact for a determination of the stream path information and the resource reservation and optionally for the stream path establishment. Hence, in contrast to the methods described in the "Background" section with respect to MSTP/RSTP and MSRP in which there may be no interworking between the routing protocol serving as an active topology control protocol and the reservation protocol, stream path determination and establishment can be adapted to a need of the data stream.

The stream path information to be determined in the step S24 may comprise an identification of the stream path, for example an identifier of the stream path. The identification may be embodied as an identifier of the stream path. The identification may be unique in the communication network 20 such that the stream path can be individually addressed by network nodes 16 of the communication network 20.

The stream path of the determined stream path information may correspond to an explicit stream path in the communication network 20. In this respect, the term "explicit stream path" may relate to a stream path which may be determined, for example by means of computation, by a single entity for example a protocol entity of a network node such as the second protocol entity 14a, 14b. For example, the explicit path may be determined upon request from another entity such as the first protocol entity 12. In contrast, a non-explicit stream path may be determined, for example by means of computation, in a distributed fashion by several entities, for example respective protocol entities of several network nodes, which may establish or install the stream path autonomously, hence independent of each other. For example, in the routing protocol such as IS-IS, the second protocol entities, particularly all second protocol entities involved, comprise a similar or identical database with respect to a content thereof, such that the entities, particularly all entities involved, may run "Dijkstra" locally and may install the outcome, such that the non-explicit stream path may be finally set up. The explicit stream path may be referenced in this application as "EP".

As illustrated in FIG. 10, the step S24 may comprise a sub-step S30 of determining whether a stream path for the data stream is already established in the communication network 20 with the already established stream path fulfilling at least one condition for the data stream to be sent. If the determination in the step S30 is in the affirmative, the determined stream path information sent in the step S26 indicates the already established stream path fulfilling the at least one condition. The already established stream path may be an explicit or non-explicit stream path. Further, the latter categories for a stream path might not apply to the already established stream path in that the stream path may be already present or existing the communication network without further determination of the latter. The at least one condition may relate to a quality of service characteristic of the data stream to be sent from the source to the destination or a transmission characteristic for the data stream to be sent from the source to the destination. The quality of service characteristic may be at least one characteristic selected from a group consisting of, for example, a delay, a delay variation, a loss, a loss ratio, etc. The transmission characteristic may be a bandwidth etc.

If the determination in the step S30 might not in the affirmative, the second protocol entity 14a, 14b may determine, in a step S32, a new stream path in the communication network 20 for the data stream to be sent such that the determined stream path information sent in the step S26 indicates the new stream path. The step S32 is an optional sub-step of the step S24. The step S32 may be performed subsequent to the step S30. For example, the step S32 may be, particularly only, triggered if it may be previously determined in the step S30 that no stream path for the data stream may be already established in the communication network 20. The step S32 may comprise computing the new stream path.

The step S32 may be performed using network topology information in the second protocol entity 14a, 14b. The network topology information may describe at least a portion of the communication network 20 or the complete communication network 20. For example, such network topology information may comprise information about potential hops in the communication network 20 and/or information about links between two hops in the communication network 20. The step S32 of determining may be performed using a metric such as costs required for establishing the stream path in the communication network 20. In this respect, the term "costs" may relate to an effort to establish the stream path and may be measured in, for example, device and/or network resources, processing capacities of one or more devices, money for the processing and/or network resources, a number and/or or kind of hops along the stream path, a number and/or kind of links along the stream path, etc. The determination of the new stream path may be performed by minimizing the costs for establishing the new stream path. The determination may also take into account routing constraints defined for the data stream, such as the above mentioned quality of service characteristic and/or transmission characteristic. The latter may be referenced in this application by "Constrained Routing". The stream path associated with the costs being minimized, optionally by taking into account the routing constraints, may correspond to the "shortest stream path". In particular, the shortest stream path may be different from the stream path having the less physical length. A stream path being different from the shortest stream path may correspond to a more complex or complicated stream path and may be referenced by the term "non-shortest stream path". The shortest stream path may represent a sort of default stream path and/or may be present in the communication network 20 if a second protocol entity may be used. Additionally or alternatively, the shortest stream path may be determined without being requested to be determined.

In a further optional step S34, the second protocol entity 14a, 14b initiates an establishment of the new stream path in the communication network 20. In one embodiment, a second protocol entity 14a sends the determined stream path information in a protocol data unit according to the routing protocol over the communication network, for example by broadcasting the protocol data unit according to procedures of the routing protocol. The protocol data unit may be embodied as a Link State Data Packet Unit (PDU) (LSP) particularly flooded by IS-IS in the communication network. In a further embodiment, the second protocol entity 14b external of the network node 16 sends the determined stream path information in a protocol data unit according to the routing protocol, for example a LSP, to a network node of the communication network 20. For example, this sending may be similarly performed as described above for the another embodiment of this step S34. The network node 16 then sends the protocol data unit according to the routing protocol over the communication network 20. The network node may be an edge network node of the communication network 20, for example the network node 16 adjacent to the destination 18. The corresponding signaling exchange is indicated in FIG. 10 by the dashed arrow portion extending between the second protocol entity 14b and the further protocol entity 23 of the network node 16.

Subsequent to the step S34, the second protocol entity 14a, 14b may determine in an optional step S36 whether the stream path is successfully established in the communication network 20. If the determination in the step S36 is in the affirmative, the method may proceed to the step S26. If the determination in the step S36 is not in the affirmative, it may be, as an optional measure, anew determined whether the new stream path is successfully established. Hence, this measure may introduce a determination loop in the second protocol entity 14a, 14b such that the second protocol entity 14a, 14b may wait until the new stream path is successfully established and may then further proceed to the step S26. In a case in which the aforementioned determination might be not in the affirmative, the second protocol entity 14a, 14b may send feedback information to the first protocol entity 12. This feedback information may indicate that the new stream path may be unsuccessfully established. The first protocol entity 12 may deduce from the receipt of the stream path information and/or from the received stream path information that the stream path is successfully established.

In a further optional step S38, the second protocol entity 14a, 14b sends an establishment indication indicating the successful establishment of the new stream path to the first protocol entity 12. The step S38 can be performed prior or subsequent to the step S26. This measure may be performed in addition or alternatively to the aforementioned deduction of the successfulness of the establishment of the new stream path by the first protocol entity 12. The establishment indication may be embodied as "Ready" information. The stream path information and the establishment indication may be sent together in one message or signaling exchange or may be sent separately. The stream path information may comprise the establishment information or the establishment information may comprise the stream path information.

The method may further comprise an optional step S40 performed prior to the step S22 in which the first protocol entity 12 receives a request for registering in receiving the data stream from the source, particularly the Listener Ready information, from the destination 18. In particular, the request for registering in receiving the data stream and the aforementioned information may be identical to one another, for example in that the respective information comprise the same content but may serve for different functionalities depending on its utilization in the communication network 20. A further optional step S42 being started between the steps S40 and S22 relates to keeping, by the first protocol entity 12, particularly all, information received in the request for registering until having received the stream path information from the second protocol entity 14a, 14b, i.e. until the step S26 is finished. In particular, the above mentioned feedback information indicating the unsuccessful establishment of the new stream path might not trigger the step of sending of the, particularly all, information received in the request for registering in the receiving of the data stream to a network node in the communication network 20.

In a further embodiment of the method of FIG. 10, the second protocol entity 14a, 14b determines the new stream path in the step S32 and sends the determined stream path information in the step S26 to the first protocol entity 12, optionally via the further protocol entity 23. The determined stream path information may comprise or may be embodied as a description of the determined stream path and an identification of the stream path. The stream path description may specify the, particularly complete, stream path to be used for the data stream. For example, the stream path may be completely specified in terms of defining hops along the stream path in the communication network 20 or may be not completely or loosely specified in terms of specifying not all hops along the stream path in the communication network 20.

Thereupon, in an optional step S37, the first protocol entity 12 initiates an establishment of the new stream path in the communication network 20 by sending the determined stream path information, i.e. the description of the new stream path and the identification of the new stream path, in a protocol data unit according to the stream reservation protocol, for example a MSRPDU. In this embodiment, the steps S34, S36 and S38 are omitted.

The system 10 may comprise a pre-configuration whether to perform the sequence of the steps S24, S34, S36, S26 or to perform the steps S24, S26 and S39. Further, the communication network 20 may also comprise a corresponding pre-configuration concerning whether the data packet unit according to the stream reservation protocol or the data packet unit according the routing protocol may carry the data stream announcement. For example, the communication network 20 is configured in such a way that the data stream announcement is sent in a data packet unit according to the stream reservation protocol and the system 10 performs the steps S24, S26 and S39. In another example, the communication network 20 is configured in such a way that the data stream announcement is sent in a data packet unit according to the routing protocol and the system 10 performs the steps S24, S34, S36, S26. At least one of these pre-configurations can be determined and installed for example, by a network operator of the communication network 20.

According to some embodiments, the stream path of the determined stream path information may correspond to a shortest stream path or a non-shortest stream path. Hence, according to some embodiments an explicit stream path may be indicated in the determined stream path information. The (explicit) stream path indicated in the stream path information may be either the already established stream path fulfilling the at least one condition or the new stream path. The already established stream path may be the shortest stream path or a non-shortest stream path. The new stream path may be also the shortest stream path or the non-shortest stream path. In the latter case, the second protocol entity 14a, 14b may initiate to establish the new determined stream path and in some embodiments the first protocol entity 12 may instruct the establishment of the new stream path.

The step S28 may be implemented in that the first protocol entity 12 may send an instruction for reserving resources in the communication network 20 in a data packet unit according to the stream reservation protocol particularly based on the stream path information. Hence, the involved first protocol entity 12 may be enabled to reserve the resources. The data packet unit may be embodied as a MSRPDU.

In some embodiments, the data packet unit sent in the step S28 and/or S39 may further comprise information indicating that the destination 18 may be capable of receiving the data stream, particularly a so called "Lister Ready" or "Listener Ready" information.

In some embodiments, the data packet unit sent in the step S28 and/or S39 may also comprise the identification of the stream path. Therefore a further network node may be enabled to associate the received data packet unit and the content thereof with a data stream upon receipt of the data packet unit. Such a network node may correspond to an intermediate network node in the communication network, for example as explained with reference to FIG. 1E, 1F, 1G. The further network node may send the received data packet unit to the proper next hop network node if the stream path may be already established. To this end, the further network node may comprise information about a stream destination address, for example a Stream Destination Address (DA), for each data stream, and information about a VLAN ID (VID) of a VLAN to which the data stream may belong. The forwarding in the further network node may be based on the VID and DA. In the case in which the stream path may be already established, for example because the stream path has been already previously established, hence is already existing in the communication network 20, or the new stream path has been successfully established as initiated by the second protocol entity 14a, 14b, then the forwarding of the data packet unit may be already installed in the network node and may follow the above described forwarding. Therefore the data packet unit may be directed to its proper destination.

In some embodiments, the data packet unit sent in the step S28 and/or S39 may further comprise the stream path description. Therefore the further network node may be enabled for packet forwarding in the case in which the new stream path may be determined but not established for example in terms of the VID and DA. A respective first entity of the further network node may initiate the determination of the next hop for the data packet unit based on the description of the stream path. The latter procedure in the further network node may be described in the following with reference to FIGS. 1E, 1F, 1G.

Figure 1F:
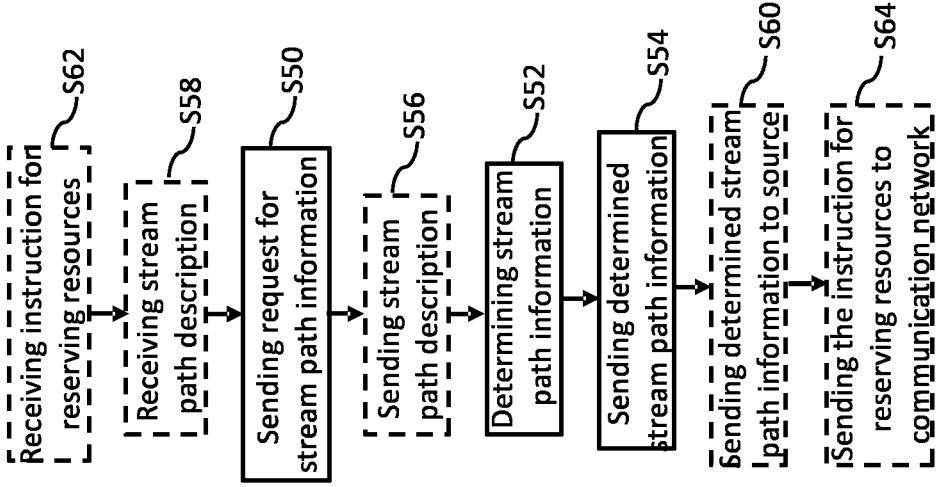
FIG. 1F is a flow diagram illustrating a method for interworking between a first protocol entity adapted to operate in accordance with a stream reservation protocol and a second protocol entity adapted to operate in accordance with a routing protocol according to an embodiment.
Figure 1D:
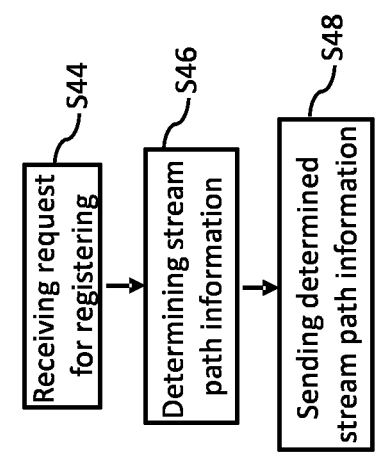
FIG. 1D is a flow diagram illustrating a method to be used in association with sending a data stream from a source of the data stream to a destination of the data stream according to an embodiment.

FIG. 1D illustrates a further embodiment of the step S14 of FIG. 1A. The method may be used in association with sending a data stream from the source to the destination 18. The method may be performed by the network node 16 comprising the first protocol entity 12 and the second protocol entity 14a. In a first step S44, a request for registering in receiving the data stream from the source in a protocol data unit according to the stream reservation protocol is received. This step may correspond to the step S40 of FIG. 1C. In a further step S46, stream path information is determined in response to the received request, wherein the stream path information indicate, for the data stream to be sent, a stream path in the communication network 20. This step may correspond to the step S24 in FIG. 1C. In a further step S48, the determined stream path information is sent, in a first option, in a protocol data unit according to the stream reservation protocol or, in a second option, in a protocol data unit according to the routing protocol. In the first option, the determined stream path information may correspond to an identification of the stream path and optionally a description of the stream path. The step S48 may be then part of the step S39 and may be performed together with the step S28 of FIG. 1C for example using one signaling exchange. In the second option, the stream path information may correspond to a stream path description describing the stream path. The step S48 may correspond to the step 34 of FIG. 1C. One or more steps described in FIG. 1C with respect to the first protocol entity 12 and the second protocol entity 14a, 14b can be also performed in conjunction with the method of FIG. 1D.

In the following, the information exchange in FIG. 1B will be further explained. According to some embodiments, as illustrated by an arrow L0, the network node 16, for example an edge bridge, may receive a data packet unit which may include a request for registering in receiving data stream, for example a MSRPDU including a Listener Ready, from the destination 18. The data packet is received by the first protocol entity 12, for example a MSRP application of the system 10 for interworking between the first protocol entity 12 and the second protocol entity 14a, 14b, for example an IS-IS application, of the system 10. As illustrated by an arrow L2, the first protocol entity sends 12 a request for stream path information to the second protocol entity 14a, 14b. As illustrated by an arrow L4, the second protocol entity 14a, 14b sends stream path information, optionally an establishment indication and optionally feedback information to the first protocol entity 12. The stream path information may comprise an identification of the stream path and optionally a description of stream path. For example the second protocol entity 14a, 14b may send stream path information comprising the identification of the EP, optionally a description of EP, optionally a Ready information and optionally feedback information to the first protocol entity 12. As illustrated by an arrow L6, the second protocol entity 14a, 14b may send a data packet unit comprising an identification of stream path, for example a LSP comprising an identification of the EP to the communication network 20, for example a bridge network. As illustrated by an arrow L8, the first protocol entity 12 may send a data packet unit to the communication network 20. The data packet unit may comprise an identification of stream path and an instruction for reserving resources and optionally a description of stream path and optionally information that the destination 18 is capable of receiving the data stream. For example, the data packet unit may be a MSRPDU comprising an identification of the EP and an instruction for reserving resources and optionally a description of the EP and optionally the Listener Ready.

The system 24 adapted to operationally execute the step S16 of FIG. 1A is illustrated in FIG. 1E. The system 24 comprises the first protocol entity 26 and the second protocol entity 28 and may be comprised in a network node 30, which may be adapted, for example, as the intermediate network node such as a core bridge of the communication network 20. The stream reservation protocol and the routing protocol may form a protocol stack in the network node 30. The first protocol entity 26 and/or the second protocol entity 28 may be adapted as an application. In case of the stream reservation protocol being MSRP, the first protocol entity 26 may be embodied as MSRP entity. In case of the routing protocol being IS-IS protocol, the second protocol entity 28 may be embodied as IS-IS protocol entity.

As illustrated in FIG. 1F, the first protocol entity 26 sends a request for stream path information indicating, for the data stream to be sent, a portion of the stream path in the communication network 20 to the second protocol entity 28 in a step S50. In a further step S52, the second protocol entity 28 determines the stream path information indicating the portion of the stream path particularly based on the request and sends in a step S54 the determined stream path information to the first protocol entity 28. The determined stream path information may comprise identification and/or a description of the portion of the stream path. For example, the second protocol entity 26 may implement functionalities related to a Bridge Local Computation Engine (BLCE), in order to accomplish the path determination. Accordingly, an easy and efficient interworking between the protocol entities 26, 28 may be enabled, since both protocols can directly interact for a determination of the required portion of the stream path.

In an optional step S56 which may be performed between the step S50 and the step S52, the first protocol entity 26 sends a stream path description describing the stream path to the second protocol entity 28. The stream path description may be previously received in an optional step S58 in a data packet unit according to the stream reservation protocol from, for example a further network node 32. The further network node 32 may be embodied as the network node 16 of FIG. 1B. The stream path description may correspond to the stream path description of the new stream path explained above. The step S52 may be performed in response to receiving, by the first protocol entity 26, the stream path description of the (new) stream path particularly from the first protocol entity 12 of the network node 16. The stream path description of the (new) stream path and the request for the stream path information may be sent together in one information exchange or message. The determined stream path information may indicate a next hop and/or a next link along the stream path.

In a further optional step S60, operationally performed subsequent to the step S54, the first protocol entity 26 sends the determined stream path information in a data packet unit according to the stream reservation protocol to the communication network 29 and/or towards the source.

In a further optional step S62, the first protocol entity 26 may receive an instruction for reserving resources along the stream path. This instruction may correspond to the instruction explained with reference to the step S28 of FIG. 1C. The instruction may be received from an or the first protocol entity 12 of an or the network node 16, respectively. The step S50 may be performed in response to receiving the instruction. The instruction for reserving resources and/or the stream path information describing the stream path may be received in an or the same protocol data unit according to the stream reservation protocol, for example MSRP. In other words, the steps S62 and S58 may overlap. The data packet unit may also comprise an identification of the stream path and/or information that the destination 18 may be capable of receiving the data stream.

In an optional step S64, the first protocol entity 26 may send the instruction for reserving resources towards the communication network 20. For example, the first protocol entity 26 may send the instruction for reserving resources, the stream path description describing the stream path, the stream path description describing the portion of the stream path, the identification of the portion of the stream path, the identification of the stream path, and/or the information indicating that the destination 18 is capable of receiving the data stream, particularly to another network node or to the source of the data stream, in a data packet unit according to the stream reservation protocol based on the received determined stream path information.

With respect to MRSP and IS-IS, the method may be implemented by, for example, the MSRP application 26 receiving the descriptor of the EP in the MSRPDU. The MSRP application 26 may then send an EP sub-Type Length Value (TLV) to the IS-IS application 28. The IS-IS application 28 can determine the missing segment of the stream path for the loose hop by means of computation, because the IS-IS application 28 has knowledge of the network topology. The IS-IS application 28 may run Dijkstra for this computation.

Figure 1G:
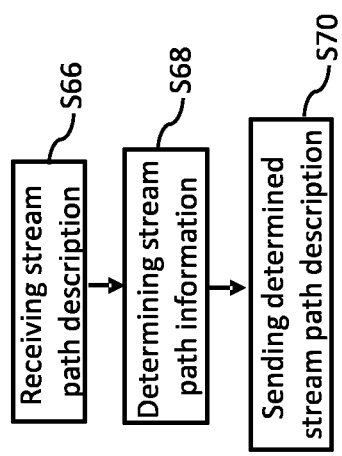
FIG. 1G is a flow diagram illustrating a method to be used in association with sending a data stream from a source of the data stream to a destination of the data stream according to an embodiment.

The method of the step S16 can be also embodied as illustrated in FIG. 1G. The method may be used in association with sending the data stream from the source to the destination 18. The method may be operationally performed by the system 24 and particularly by the network node 30. In a first step S66, a stream path description describing the stream path is received in a protocol data unit according to the stream reservation protocol. In a further step S68, the stream path information is determined based on the received stream path description. The determined stream path information indicates, for the data stream to be sent, a portion of the stream path in the communication network 20. In a further step S70, the stream path description is sent, in accordance with the determined stream path information, in a protocol data unit according to the stream reservation protocol. One or more steps described in FIG. 1F with respect to the first protocol entity 26 and the second protocol entity 28 can be also performed in conjunction with the method of FIG. 1G.

In the following, the information exchange in FIG. 10 will be further explained. As illustrated by an arrow L10, the first protocol entity 26, for example an MSRP application, of the system 24 for interworking between the first protocol entity 12 and the second protocol entity 28, for example an IS-IS application, of the system 24 may receive a data packet unit from a further network node, for example an edge bridge. The system 24 may be part of the network node 30, for example a core bridge. The data packet unit may comprise an instruction for reserving resources, a stream path description and optionally information that the destination 18 may be capable of receiving the data stream. For example, data packet unit may be a MSRPDU comprising the instruction for reserving resources, a descriptor of an EP and optionally a Listener Ready. As illustrated by an arrow L12, the first protocol entity 26 may send a request for stream path information, for example for a stream path description, to the second protocol entity 28. As illustrated by an arrow L14, the second protocol entity 28 may send stream path information, for example identification of a portion of a stream path and/or a description of the portion of the stream path, to the first protocol entity 26. As illustrated by an arrow L16, the first protocol entity 26 may send a data packet unit to the communication network 20, for example a bridge network. The data packet unit may comprise an instruction for reserving resources and a description of the stream path, optionally an identification of the portion of stream path and optionally information that the destination 18 is capable of receiving the data stream. For example, the data packet unit may be a MSRPDU which may comprise the instruction for reserving resources and the description of the EP and optionally the identification of the portion of the stream path and optionally the Listener Ready.

In the following, further embodiments are described with reference to MSRP and IS-IS and respective MSRP and IS-IS entities or applications without loss of generality. However other suitable protocols and entities are also encompassed by the description of the embodiments. For example, TCP or a PCEP based protocol may be used instead of IS-IS. The MRSP entity and/or IS-IS entity may be referred to in the following as MRSP and IS-IS, respectively, for ease of description. Further, network nodes of a respective communication network may be embodied as bridges without loss of generality.

In some embodiments, a method for interworking between SRP and MSRP, respectively, and IS-IS applications is provided.

Either the MSRP entity or IS-IS entity can be used for the establishment of explicit paths needed for the data streams, if any. The reservation is performed by the MSRP application(s) on top of the given stream path.

The edge bridges communicate with the source and the one or more destinations for example end stations which may act as a Talker or a Listener by means of MSRPDUs.

Either Link State Protocol Data Units (PDU) (LSP)s or MSRPDUs are used for path establishment in the network depending on which operation mode is chosen. MSRPDUs are used to perform the reservation actions.

The MSRP application and IS-IS application of the edge bridges have to interact and interwork, in order to implement the method. If MSRP is used for path establishment as well, then the MSRP and IS-IS applications of intermediate or core bridges may need to interwork as well.

If an edge bridge may receive a reservation request, for example a Listener Ready message, from an end station, then the MSRP application triggers the IS-IS application to perform at least its path computation tasks and maybe path establishment as well. The MSRP application may halt any further action until getting feedback from the IS-IS application. The reservation is then done by MSRP along the path got from IS-IS, which may also involve path establishment, if IS-IS might have not performed it.

Finally, the stream path between the source or Talker and the destination or Listener is established through the communication network such that the resources necessary for the data stream are also reserved.

Some embodiments may enable an interworking between MSRP and IS-IS, which does not exist today. The interworking may be necessary to be able to use SRP in IS-IS controlled bridge networks and leverage IS-IS capabilities.

In some embodiments, a bridge network implementing (M)SRP and IS-IS, optionally with Qca, and also an interface between the latter two, is provided. A respective network node in the form of a network bridge may comprise a MRSP application, an IS-IS application and an interface between the latter both. The IS-IS application can implement Qca functionalities like path computation and/or path installation or may be coupled to an external Qca implementing node such as a central network controller. The IS-IS application or the external Qca implementing node may implement functionalities related to PCE as described with respect to FIG. 1B. A MSRP application triggers a stream path determination or stream path establishment from IS-IS by requesting respective session path information when needed to connect a Listener to a Stream. The session path information may indicate the session path for the data stream to be sent in the bridge network. It is noted that within the context of this application, the terms "session" and "stream" may be used in an interchangeable way. An IS-IS application determines whether existing stream paths are satisfactory/suitable for the data stream, hence meet necessary constraints or requirements etc. If such a stream path is existing, the IS-IS application provides respective stream path information to the MSRP application. If such a stream path is not already established, the IS-IS application determines a new explicit stream path or tree. If the IS-IS application is only used to control path establishment, then the IS-IS application initiates an establishment of the stream path and waits until the IS-IS application is sure that the stream path is successfully established, hence can be used for the data stream. The IS-IS application then notifies the MSRP application about the stream path information indicating the new stream path. To this end, the session path information comprises the Explicit Path (EP). If no suitable stream path is (not) already established, the IS-IS application determines a new explicit stream path or tree. The IS-IS application sends the stream path information to the MSRP application, which include in addition to the EP the description of the determined stream path, for example an Explicit Path Descriptor. If the stream path is already existing, then the MSRP application performs stream reservation tasks for example by sending a Listener Ready in a MSPRDU along the stream path; if no stream path is existing, then the MSRPDU carries the description of the stream path as well and the stream path is establishment and reservation are done together.

In some embodiments, a bridge network controlled by IS-IS has to provide a method for interworking with MSRP run by the devices, e.g. end stations or hosts attached to the edge bridges (EB). In case of a bridge network, the IS-IS control includes all the add-ons specified for bridges by IEEE 802.1Q and its amendments like 802.1aq and 802.1Qca (Qca). The term IS-IS as used in this application involves all these Layer 2 (L2) add-ons, therefore, the latter are not mentioned separately. It is noted that not all of these features are used in all embodiments.

Figure 1H:
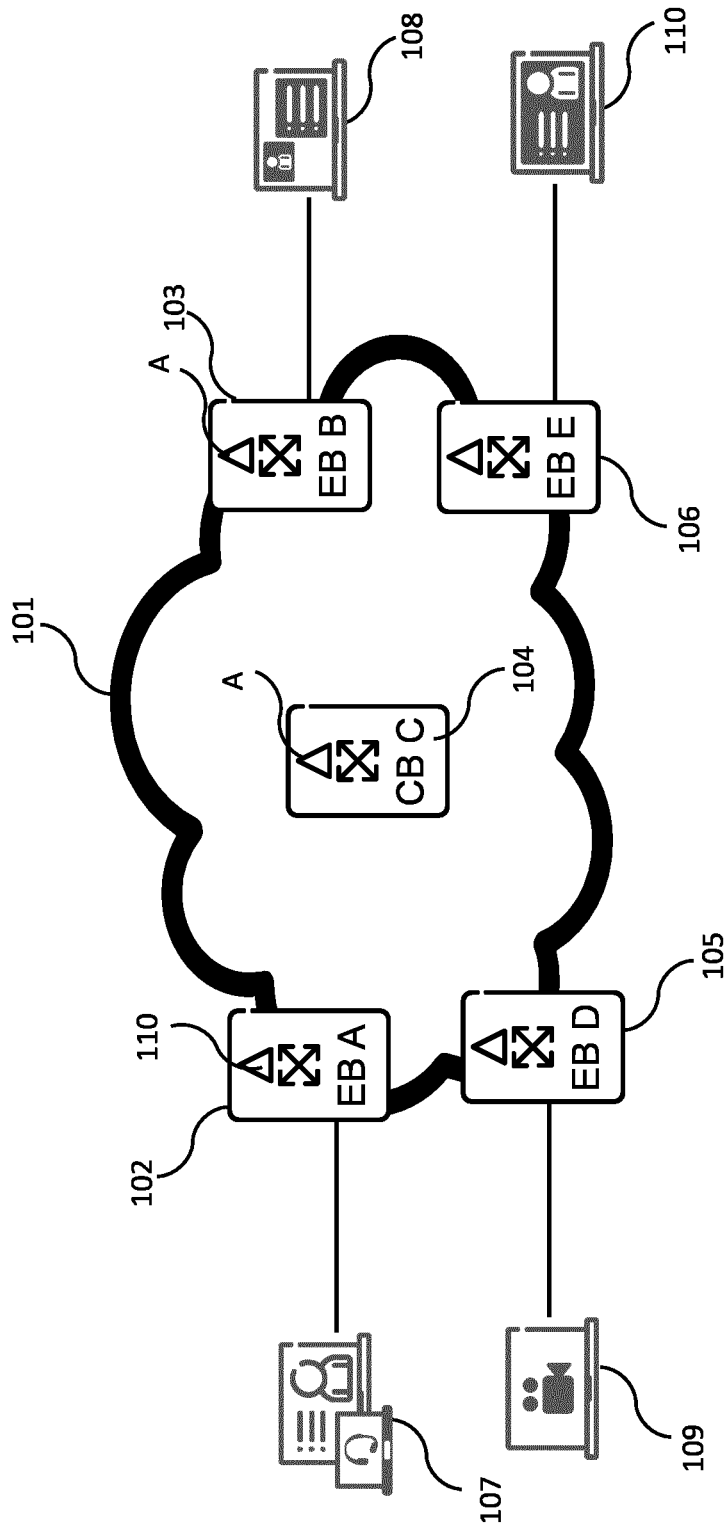
FIG. 1H is a block diagram illustrating an exemplary communication scenario in accordance with an embodiment.

FIG. 1H illustrates an exemplary communication network. The communication network may be embodied as a bridge network 101 controlled by IS-IS. Bridge networks are comprised of edge bridges (EB) such as 102, 103, 105, 106 and core bridges (CB) like 104. The triangles denoted by A indicate control applications run on bridges. End stations like Talkers and Listeners, e.g. 107, 108, 109, 110, are connected to edge bridges 102, 103, 105, 106.

Figure 2B:
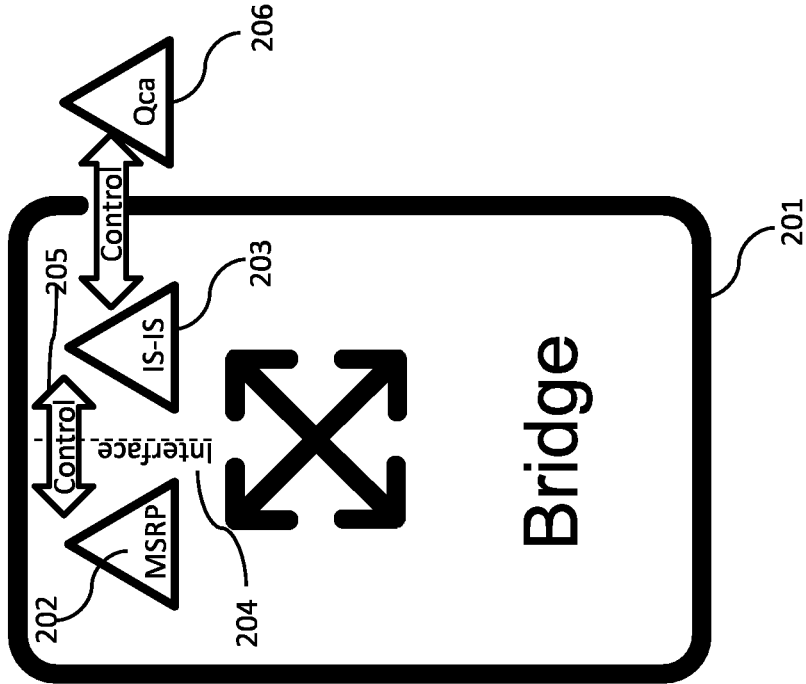
FIG. 2B is a block diagram illustrating an exemplary edge network node according to an embodiment, in which the network node is embodied as a bridge with a MSRP application and an IS-IS application implementing 802.1Qca extensions and also comprises some 802.1Qca functions implemented outside of the bridge.
Figure 2A:
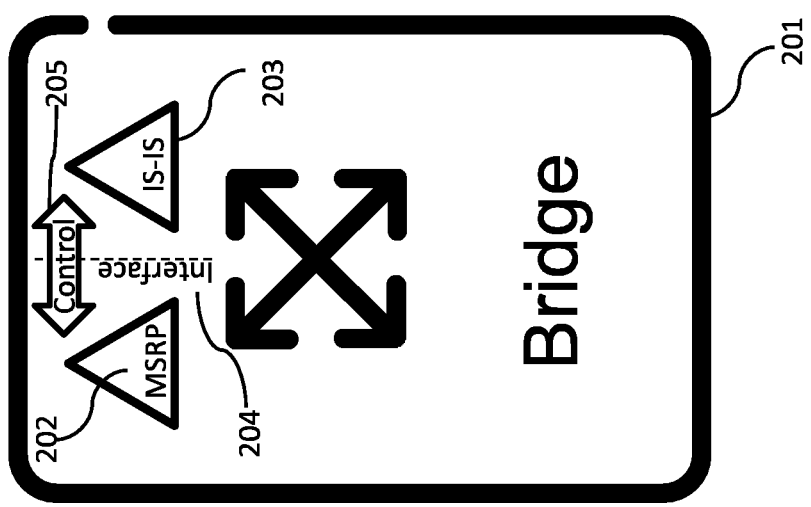
FIG. 2A is a block diagram illustrating an exemplary edge network node according to an embodiment, the network node being embodied as bridge with a MSRP application and an IS-IS application implementing 802.1Qca extensions.

FIG. 2A illustrates a bridge 201 which at least hosts an MSRP application 202 and an IS-IS application 203. Note that a bridge 201 may run further applications. In order to implement the interworking between MSRP and IS-IS, control exchange is needed between the two applications 202, 203 as shown by an arrow 205. It is often called an interface 204 between two entities if interaction, e.g. control exchange, is required between them. In this respect, the bridge 201 may comprise an interface between the respective protocol applications or entities 202, 203. As mentioned above, IS-IS, e.g. IS-IS application 203 includes L2 features as well, e.g. Qca features. However, in some embodiments some Qca features are implemented outside of the bridge 201 as shown by a reference numeral 206 in FIG. 2b. The two embodiments are not distinguished for the rest of the application and both embodiments are possible for the methods, systems, nodes etc described here, or in other words, can be applied in conjunction with the methods, systems, nodes, communication systems, computer programs and computer program products. Therefore, the following description makes use of the bridge embodiment of the FIG. 2A without loss of generality.

Figure 3:
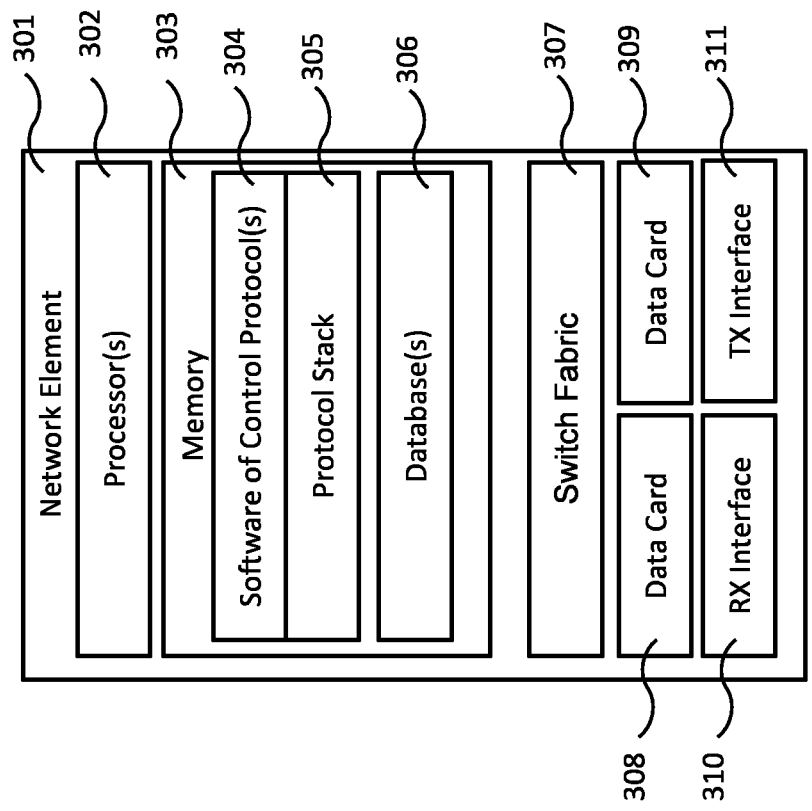
FIG. 3 is block diagram illustrating an exemplary network node according to an embodiment, in which the network node implements a MSRP application and an IS-IS application implementing 802.1Qca extensions.

The apparatus according to an embodiment implementing the proposed method is shown in FIG. 3 in more detail. The network element 301 hosts an IS-IS software 307 and a Stream Reservation software 308 as well. The network element 301 example illustrated in FIG. 3 includes a data plane including a switching fabric 307, a number of data cards, e.g. 308 and 309, at least a receiver (Rx) interface 310 and at least a transmitter (Tx) interface 311. The Rx and Tx interfaces 310 and 311 interface with links on the network, the data cards 308 and 309 perform functions on data received and sent over the interfaces 310 and 311, respectively, and the switching fabric 307 switches data between the data cards 308, 309/I/0 cards 310, 311. The network element 301 also includes a control plane, which includes one or more processors 302 containing control logic configured to implement e.g. a link state routing process for controlling shortest path based forwarding. Furthermore, the processors 302 also implement the logic for path computation and reservation. Other processes may be implemented in the control logic as well. The network element 301 also includes a memory 303, which stores software for control protocols 304, a protocol stack 305, one or more databases 306. The software for control protocols 304 contains data and instructions associated with the IS-IS and the MSRP process. The protocol stack 305 stores network protocols implemented by the network element 301, e.g. IS-IS and MSRP. The databases are e.g. used for determining and storing the forwarding paths. The network element 301 may contain other software, processes, and stores of information to enable it to perform the functions for the proposed path control and reservation method and to perform other functions commonly implemented in a network element on a communication network.

In the following, the method for interworking between MSRP and IS-IS according to two embodiments will be described. The method differ in how exactly the two control protocols are used within the communication network.

Figure 4:
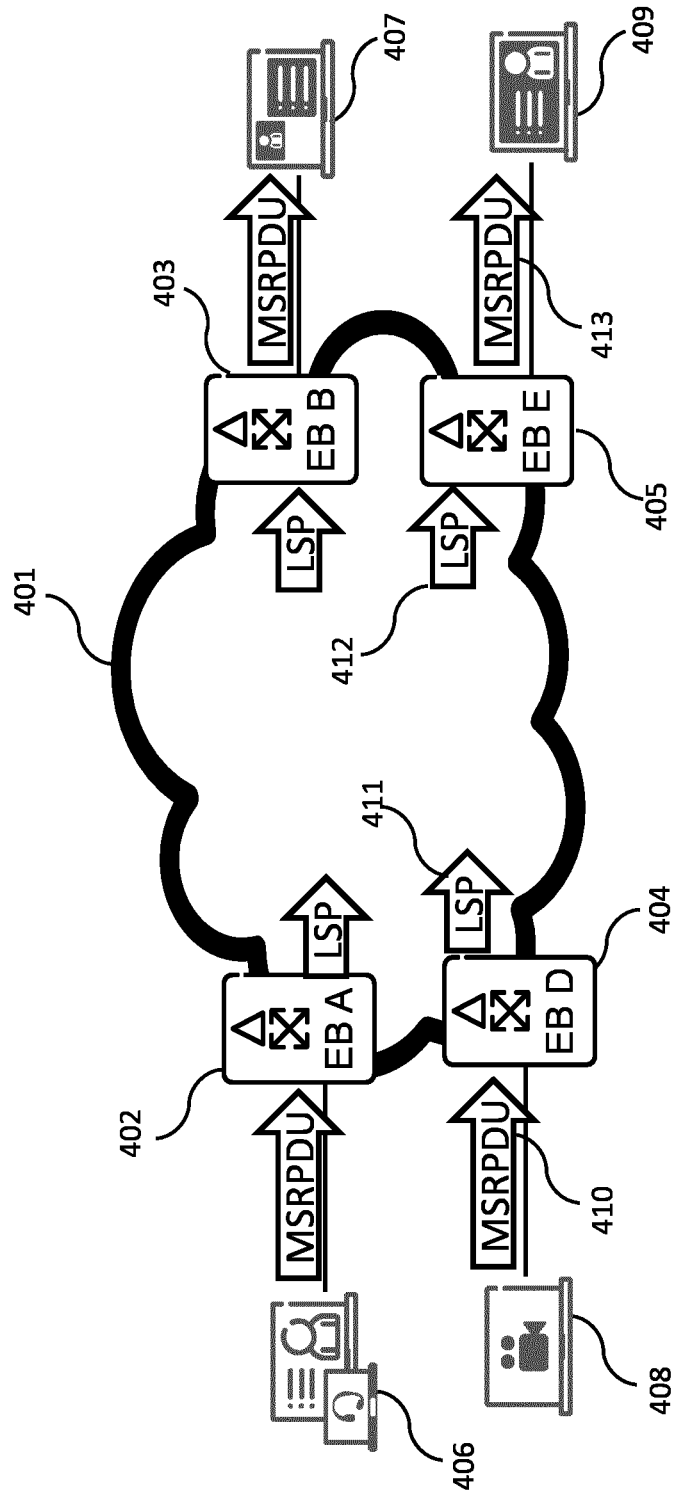
FIG. 4 is a block diagram illustrating a communication scenario according to an embodiment, in which a bridge network only uses IS-IS features for path establishment and for propagating a Talker Advertisement in the network.

The method according to the first embodiment is referenced in the following as option A. In this method, the forwarding paths are only installed by IS-IS as illustrated in FIG. 4. That is, only Link State Protocol Data Units (LSP) 411, 412 are propagated within the network for path establishment, i.e. only LSPs 411, 412 carry path information. It is noted that the LSPs may also carry Talker Advertisement information for SRP.

Figure 5:
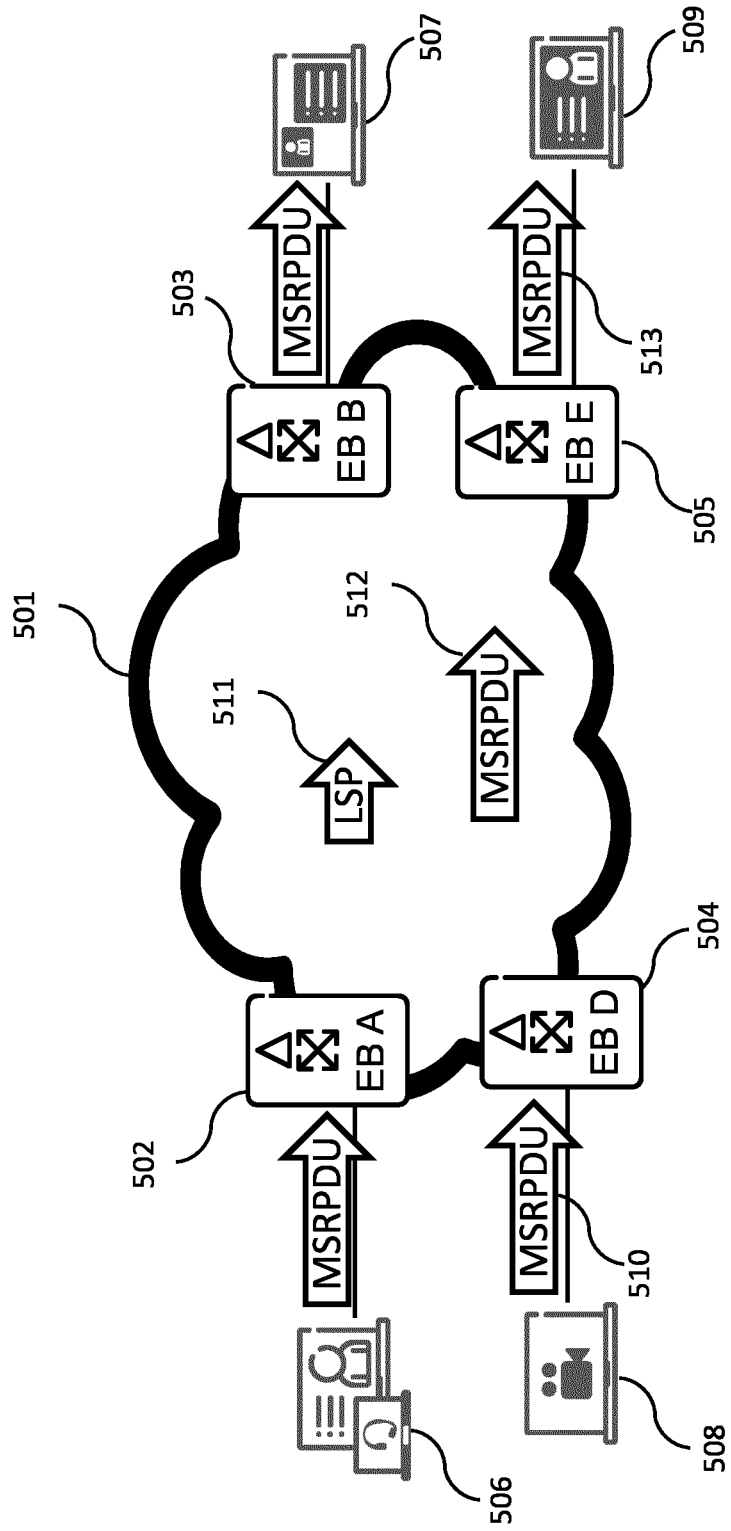
FIG. 5 is a block diagram illustrating a communication scenario according to an embodiment, in which a bridge network uses both IS-IS and MSRP features for path establishment and for propagating Talker Advertisement in the network.

The method according to the second embodiment is referenced in the following as option B. In this method, forwarding paths are also established by MSRP operations. Thus, not only LSPs 511 but MSRPDUs 512 also carry path information in the network as illustrated in FIG. 5.

The operation is somewhat different in the network 401, 501 depending on the two options A and B, which are discussed further below. The operation between edge bridges and Talkers/Listeners is the same for the two options A and B, which will be explained first by describing a method for sending a data stream from a source of the data stream to a destination of the data stream according to an embodiment.

Figure 6A:
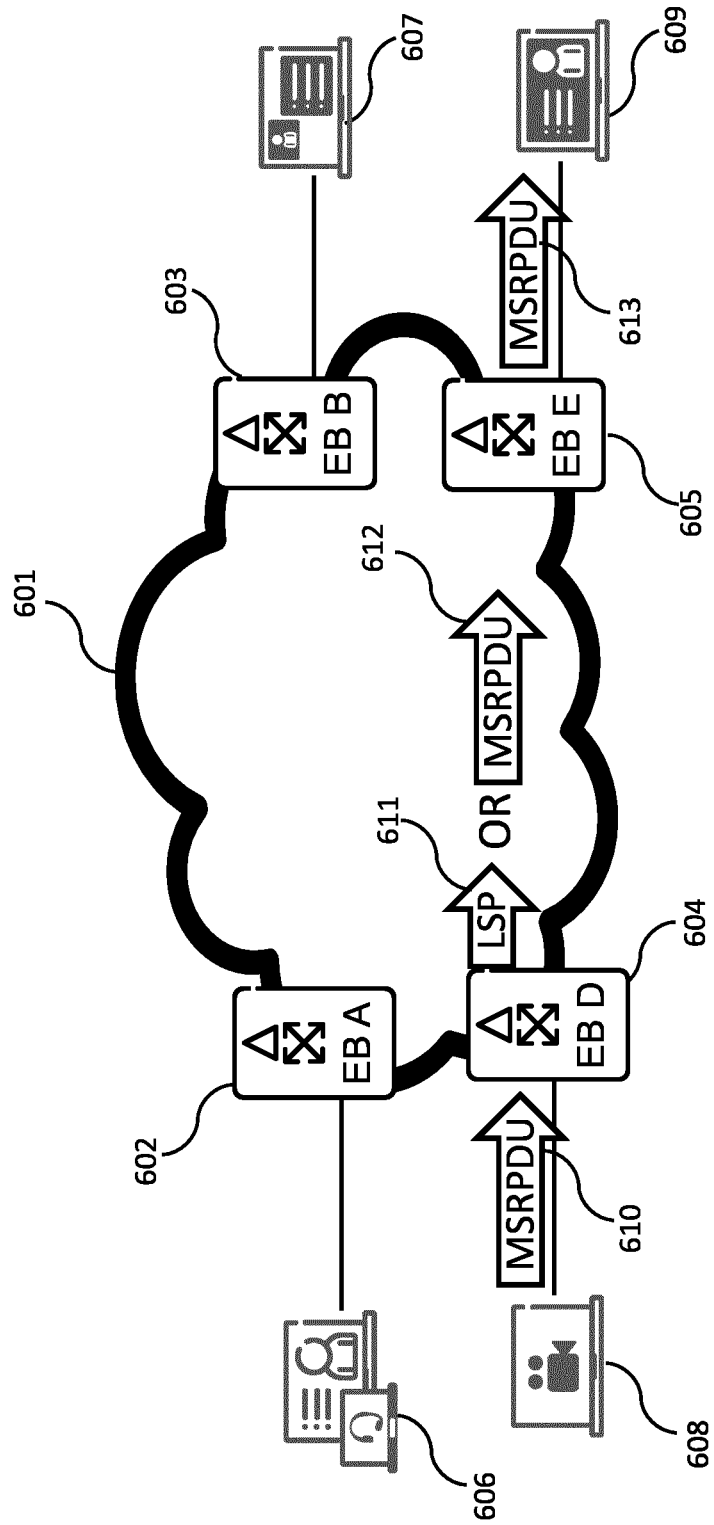
FIG. 6A is a block diagram illustrating a communication scenario according to an embodiment, in which a Talker Advertisement is propagated from a Talker to a Listener.

The operation of the method is initiated as shown in FIG. 6A, when a Talker 608 initiates a stream announcement called a Talker Advertisement. To this end, the Talker 608 for example sends an MSRPDU 610 to the bridge EB D 604 it is connected to. EB D 604 then propagates Talker Advertisement into the network 601. The Talker Advertisement information gets to all bridges 602-605 in the network 601 either by means of being flooded in LSPs 611 or by propagating MSRPDUs 612 according to MSRP operations. It is noted that Talker Advertisement does not directly correspond to path establishment therefore it is independent of which option, i.e. option A or option B, is used. Hence, both LSP and MSRPDU propagation of Talker Advertisement can be combined both with option A and option B.

In some embodiments of the method, if a protection scheme is applied for a stream then multiple paths may need to be provided for the stream. The operation is the same for each path and it does not depend on which option, namely option A or option B, is chosen.

Figure 6B:
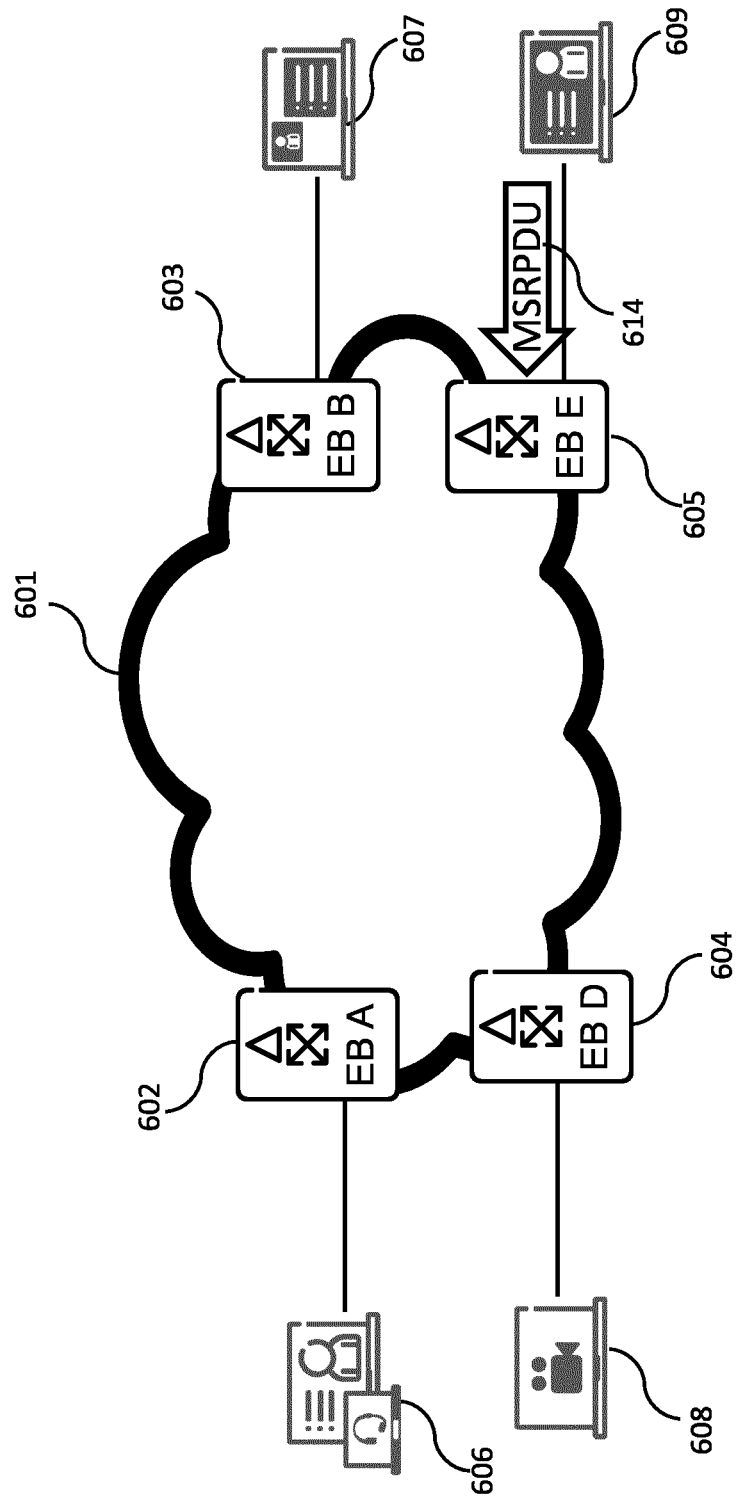
FIG. 6B is a block diagram illustrating a communication scenario according to an embodiment, in which a Listener initiates its registration in receiving a data stream.

If then there is a Listener that is interested in receiving a given stream, then the Listener registers for receiving the stream from the Talker as shown in FIG. 6B. To this end, the Listener 609 initiates its registration for the data stream for example by sending an MSRPDU 614 containing the Listener Ready information to the bridge 605 it is attached to.

The received Listener Ready MSPRDU 614 is then processed by the MSRP application of the receiver bridge 605. The receipt of the Listener Ready MSRPDU 614 is illustrated in a step 1101 of FIG. 11 and in step 1201 of FIG. 12. Such a receiver bridge 701 is illustrated in FIG. 7. It is noted that the bridge 605 can be identical to the bridge 701. After processing the Listener Ready, the MSRP application 702 triggers IS-IS operations through the control channel 205 between them, e.g. by sending a request 705. The MSRP application 702 may hold the information received in the MSRPDU, for example does not forward it to any other device until it gets some reply from the IS-IS application 703. The remaining of the operation in the network 601 depends on which operation mode is used, as described in the following.

Figure 6C:
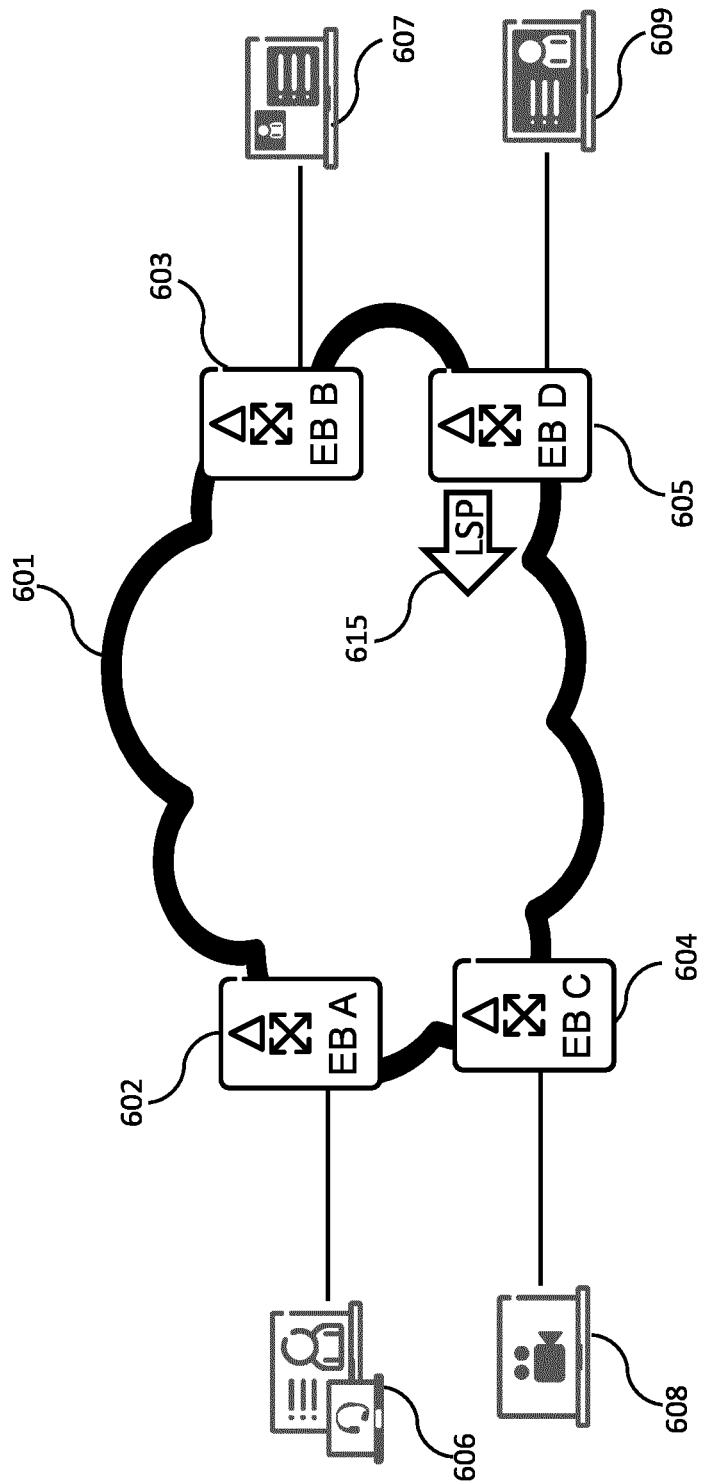
FIG. 6C is a block diagram illustrating a communication scenario according to an embodiment, in which an IS-IS establishes a stream path in the network for the data stream.
Figure 6D:
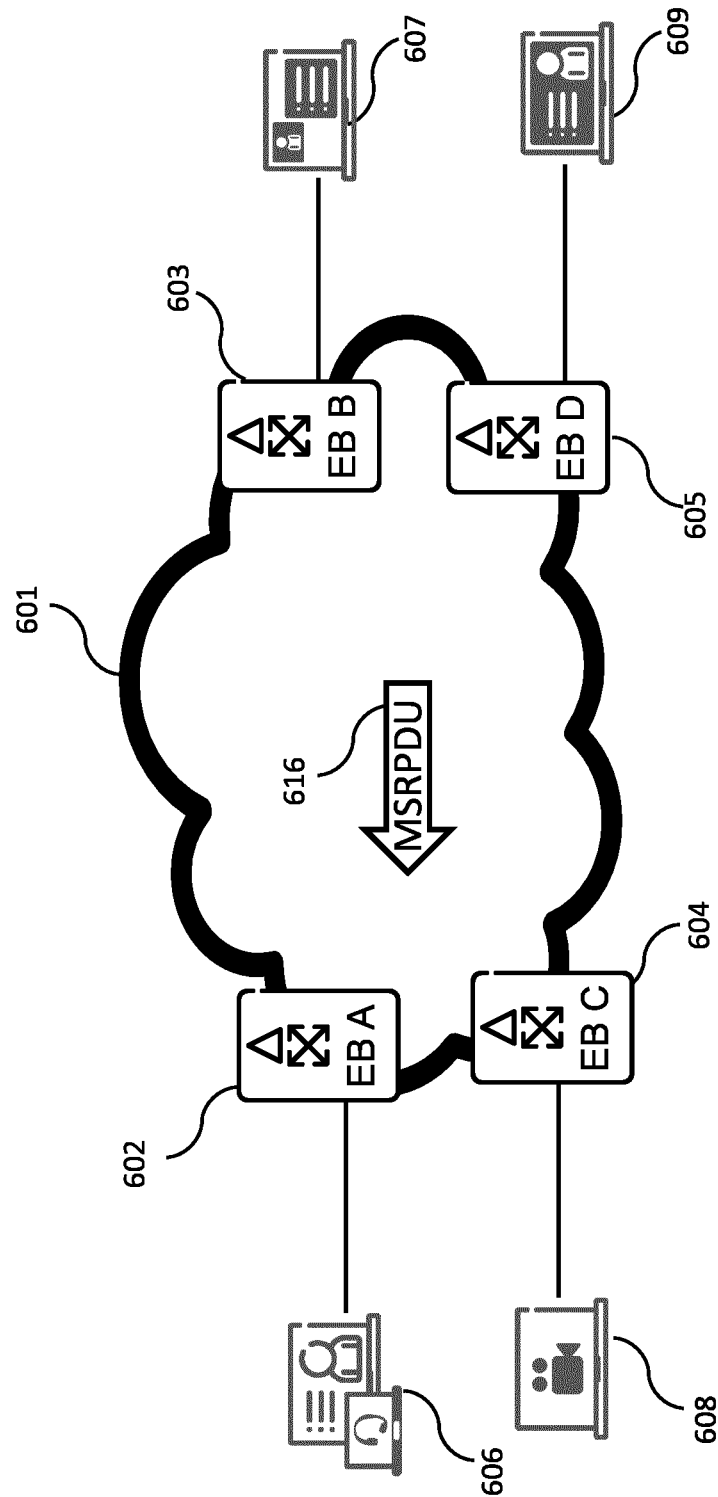
FIG. 6D is a block diagram illustrating a communication scenario according to an embodiment, in which MSRP performs stream resources reservation on the stream path established by the IS-IS protocol.
Figure 6E:
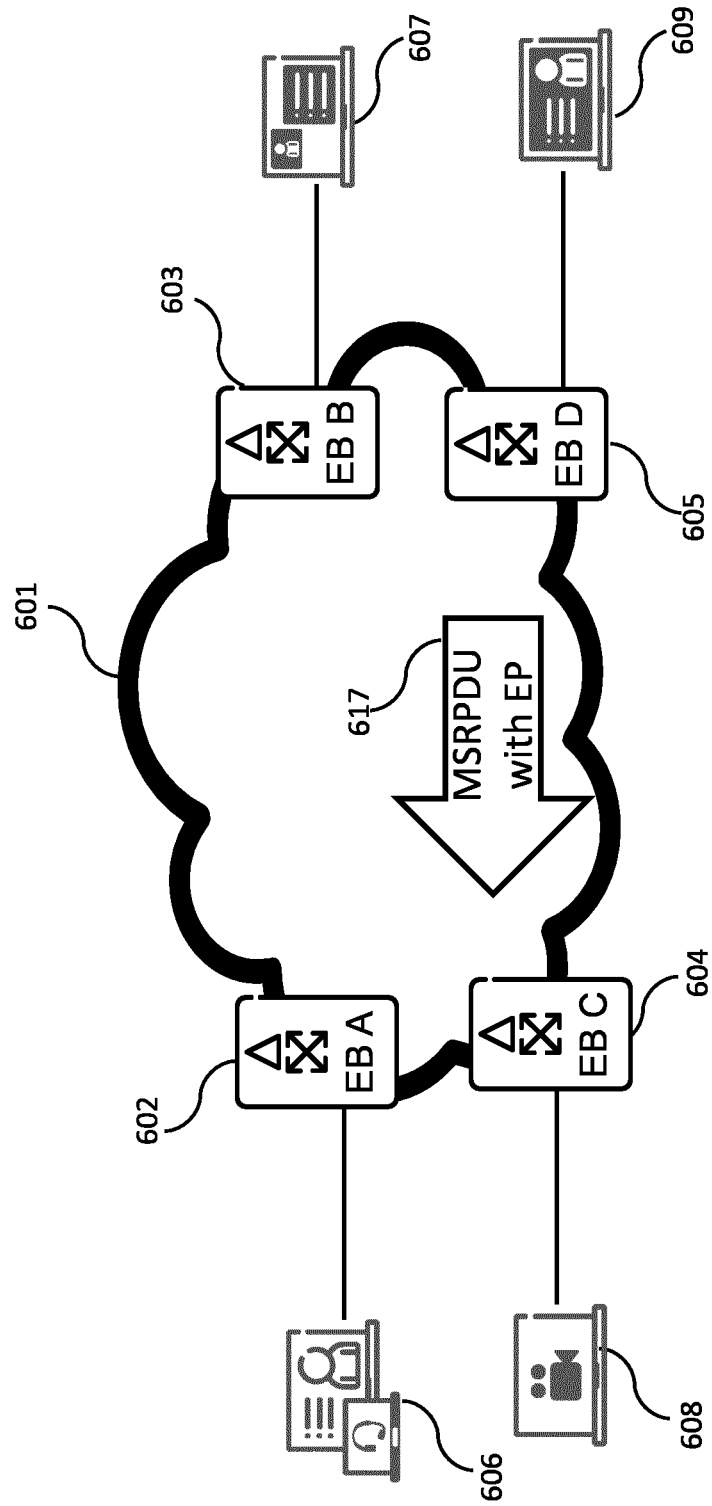
FIG. 6E is a block diagram illustrating a communication scenario according to an embodiment, in which a MSRP performs both stream path establishment and stream resources reservation.
Figure 6F:
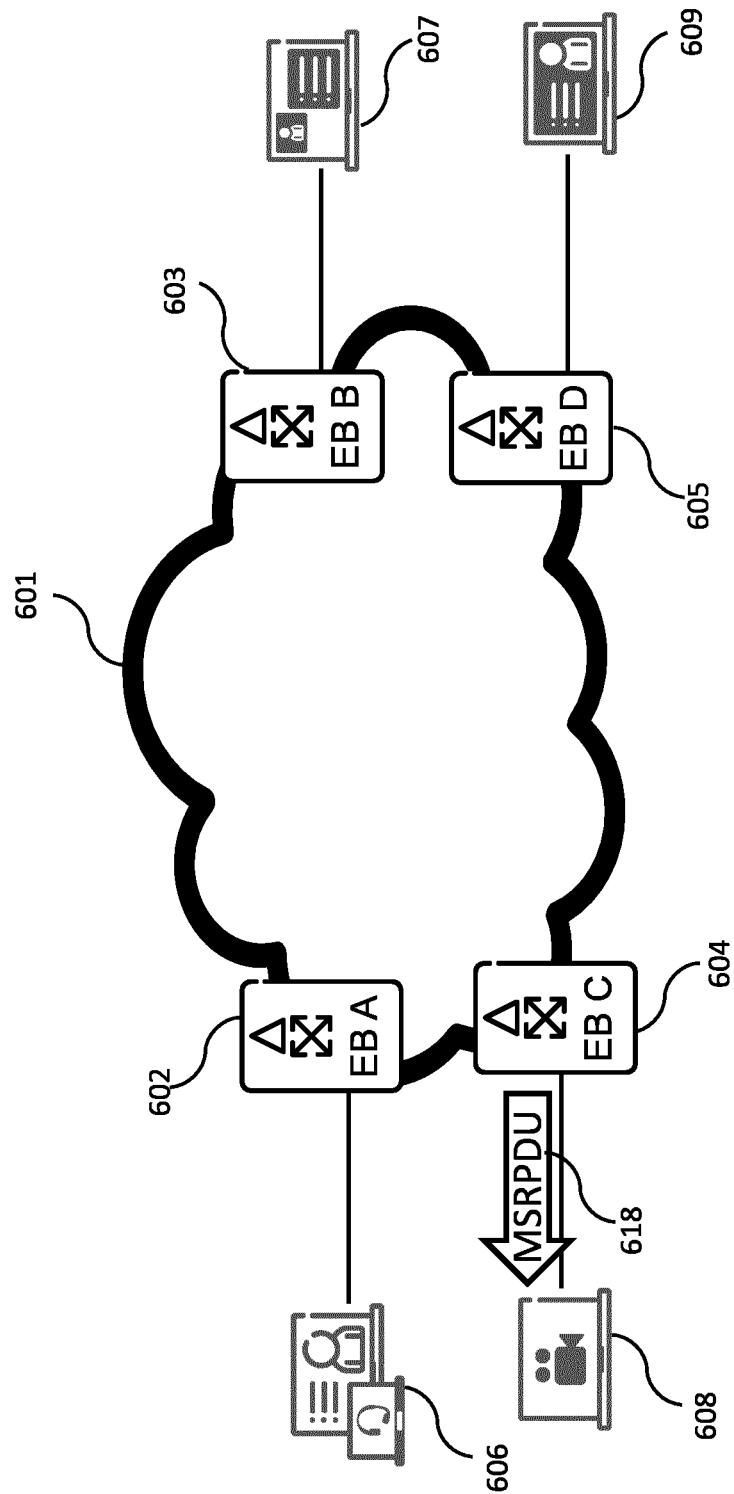
FIG. 6F is a block diagram illustrating a communication scenario according to an embodiment, in which MSRP performs both stream path establishment and stream resources reservation.

However, the very last step of the method is the same for the two options A and B, since it is performed outside of the network 601 as shown in FIG. 6F. If the path establishment and reservation actions have been successfully performed for the stream in the network 601, then the bridge 604 adjacent to the Talker 608 sends the Listener Ready MSRPDU 618 to the Talker 608. Then the Listener 609 finally gets the stream it is registered for.

In the following, the method according to the embodiment and the second embodiment are described in more detail.

In the first embodiment or option A, stream paths are only established by IS-IS.

The embodiment is applicable in a case in which an explicit stream path may be to be established for the communication network 601. The embodiment may be also applicable in a case in which the shortest path may be used. If such a case path establishment is performed by IS-IS. The reservation is then done by MSRP operations on top of the paths established by IS-IS. The explicit stream path can be not completely defined, for example by loose hops, or can be completely defined, i.e. all hops and links are defined, and the explicit path can comprise the shortest path or another path different from the shortest path, hence the non-shortest path.

Figure 11:
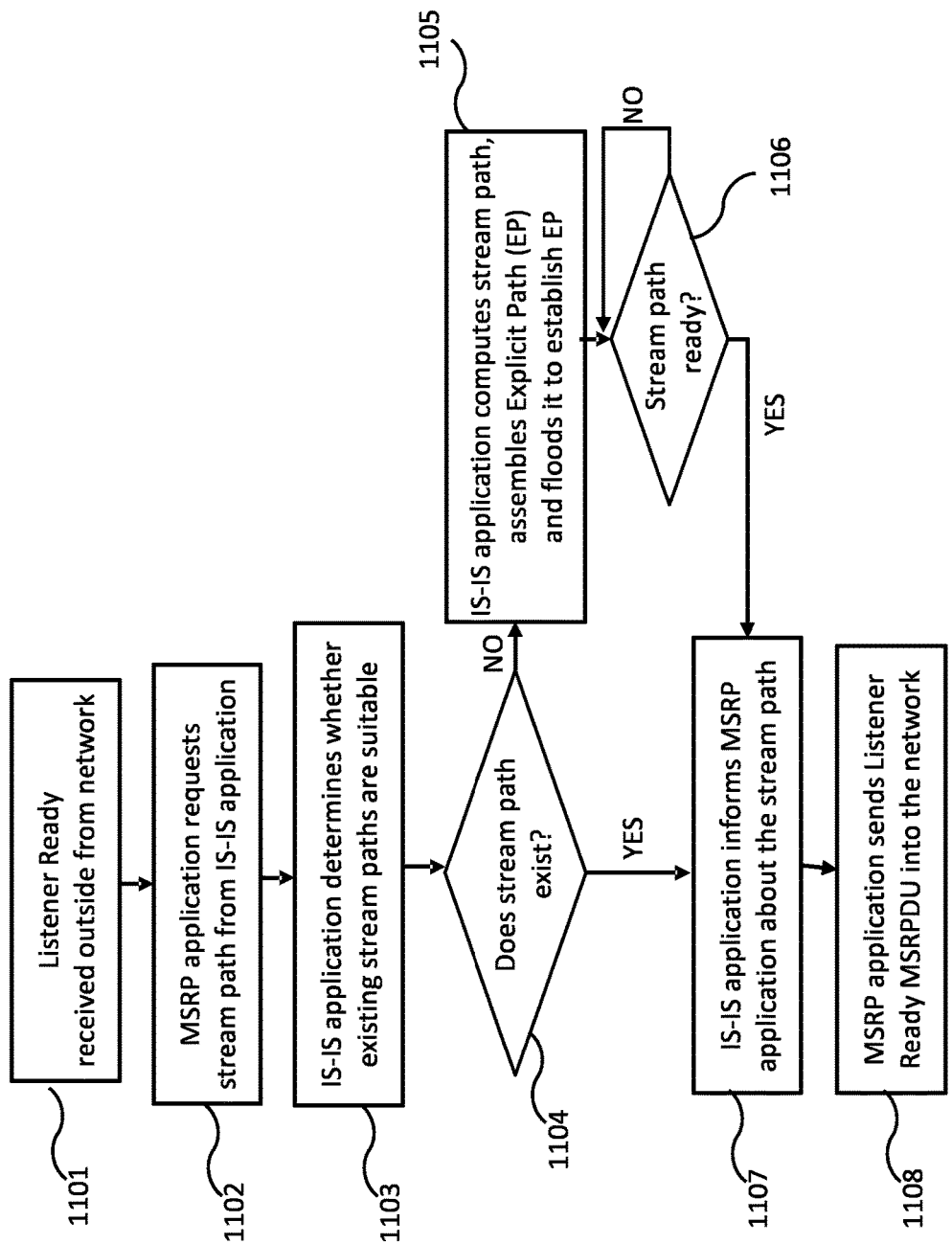
FIG. 11 is a flow diagram illustrating a method for interworking between a MSRP and an IS-IS protocol according to an embodiment, in which the IS-IS is used for a stream path establishment.
Figure 12:
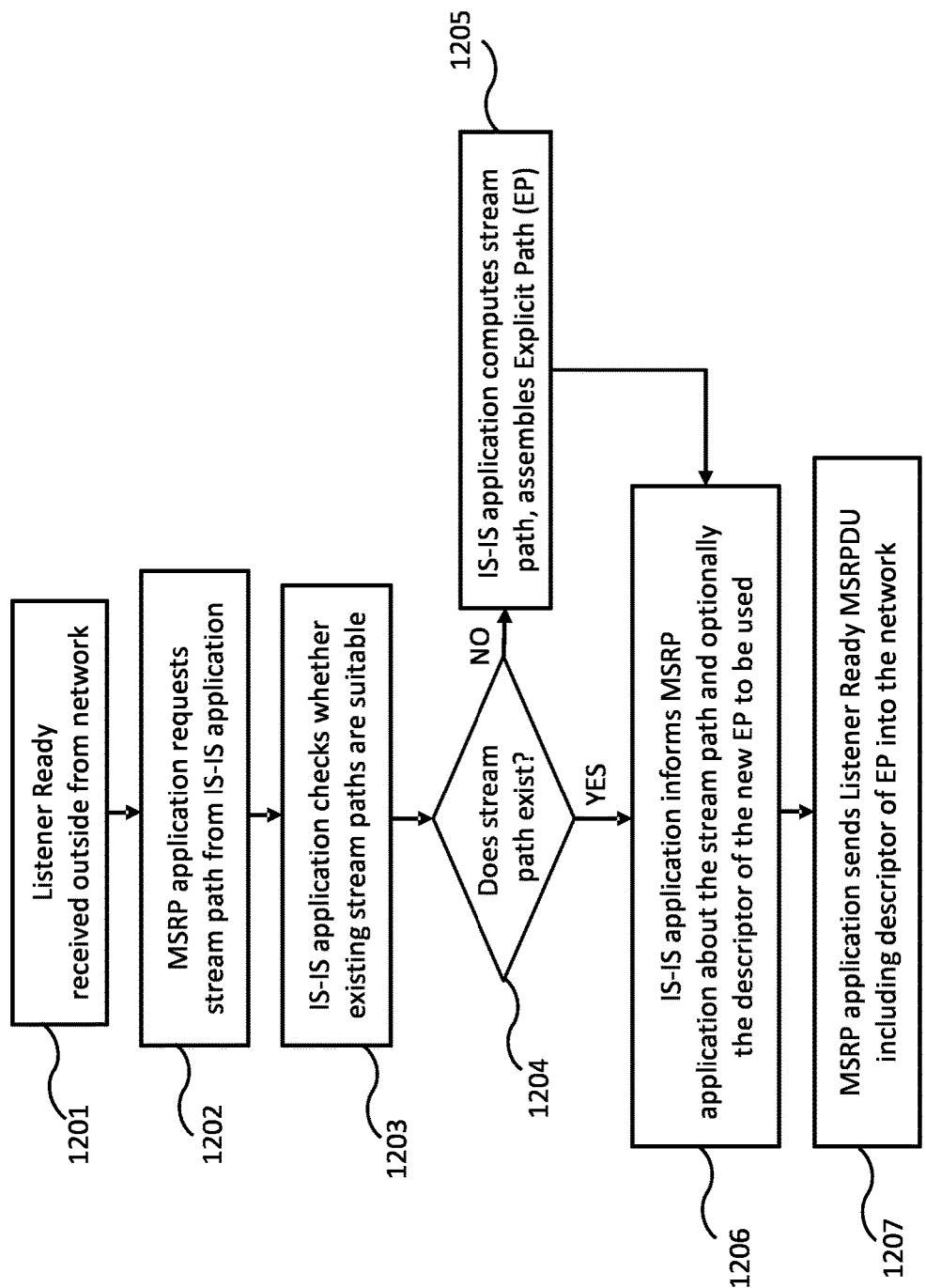
FIG. 12 is a flow diagram illustrating a method for interworking between a MSRP and an IS-IS protocol according to an embodiment, in which the MSRP is used for stream path establishment.

The operation of the method is shown in FIG. 11. After receiving an MSRPDU with Listener Ready at a boundary port in a step 1101, the MSRP application 702 triggers, as shown by 705 in FIG. 7, IS-IS operations in a step 1102, in order to get the path to be used for the stream. Note that path is used as a generic term here; it might actually be a tree, if there are multiple Listeners of a stream. The aforementioned boundary port may represent a port of the edge bridge facing outside of the communication network, for example the port of the edge bridge 605 which connects the edge bridge 605 to the destination 609.

The MSRP application 702 might not forward the Listener Ready information to any other network node until it gets feedback from the IS-IS application 703.

The IS-IS application 703 then checks in a step 1103 whether a path already exists, in order to carry the stream. However, it may be that no existing path meets e.g. the QoS or the bandwidth requirements of the stream. If this is the case, then in a step 1105 the IS-IS application 703 computes a path that meets the requirements of the stream. In the step 1105, the IS-IS application 703 also assembles the descriptor of the new Explicit Path (in a sub-Type-Length-Value (TLV)) and floods it into the network 601 in an LSP 615, in order to get it established or installed in the network 601, as shown in FIG. 6C. The IS-IS application 703 then waits in a step 1106 until it is sure that the path is established or installed in the network 601. For example, the IS-IS application may wait sufficiently long enough to implement that the IS-IS application is sure that the path is established. Alternatively, a method according to U.S. 61/991,306 with the title "OAM AIDED EXPLICIT PATH REPORT VIA IGP" or a method according to U.S. 61/822,696 with the title "METHOD FOR ASSURED NETWORK STATE CONFIGURATION AND ROLLBACK IN LINK-STATE PACKET NETWORKS" can be used, the content of both applications being herewith incorporated by reference.

It is noted that if the EP contains loose hops or Constrained Routing actions have to be performed, then the IS-IS application of the core bridges 104 perform IS-IS operation actions to have the path established or installed as specified by the L2 extensions to IS-IS; no interaction might be needed between MSRP and IS-IS applications in the core bridges 104.

After having the path to be used for the stream, the IS-IS application 803 informs the MSRP application 802 in a step 1107 on which path is to be used. As shown in FIG. 8, the IS-IS application 803 may send a Ready 805 signal to the MSRP application 802. Other kind of feedback signal from the IS-IS application 803 to the MSRP application 802 can be used instead of the Ready 805 signal.

In a step 1108, the MSRP application 802 then sends out the Listener Ready in an MSRPDU 616 into the network, which is propagated along the path whose information having been received from IS-IS and the corresponding reservation actions are performed in the network nodes by MSRP operations as shown in FIG. 6d.

Finally, Listener Ready is received by the Talker 604, as it is illustrated in FIG. 6F and described above.

In the second embodiment or option B, explicit stream paths are also established by MSRP instead of IS-IS, thus the MSRP also performs path establishment actions together with the reservation actions.

In this embodiment, the descriptor of the explicit path to be used by the stream is also carried in the same MSRPDU 617 carrying the reservation information as shown FIG. 6E. Thus, IS-IS only establishes the shortest paths, if other path is needed to be established, then MSRP drives the path establishment.

The operation of the method is shown in FIG. 11. The first four steps 101-1104, 1201-1204 are the same for the two options, i.e. the same as in FIG. 10. The two options deviate from a fifth step 1105, 1205 counted from a starting step 1101, 1201 in the sequence direction of the method onwards, i.e. from a step 1105 and 1205 onwards.

After receiving a MSRPDU 614 with Listener Ready at a boundary port in a step 1201, the MSRP application 702 triggers 705 IS-IS operations in a step 1202, in order to get the path to be used for the stream.

The IS-IS application 703 then checks in a step 1103 whether a path meeting the requirements concerning for example QoS and bandwidth already exists, in order to carry the stream.

If existing paths do not meet the needs, then in a step 1205 the IS-IS application computes an Explicit Path that meets the requirements.

Figure 9:
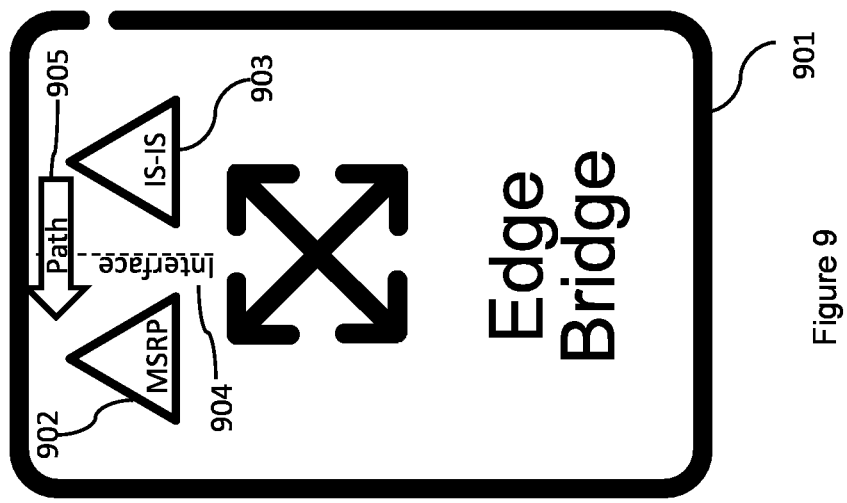
FIG. 9 is a block diagram illustrating a network node according to an embodiment, in which a stream path description is provided to an MSRP application.

In a step 1206, the IS-IS application 903 then informs the MSRP application 902 on which path to be used and if a new path needed, then provides the EP, for example the EP descriptor, determined in the step 1205. IS-IS application 903 providing the feedback 905 to the MSRP application 902 in this case is also shown in FIG. 9.

The MSRP application 902 then sends out the MSRPDU 616, 617 with Listener Ready in a step 1207. The MSRPDU 617 also contains the descriptor (sub-TLV) of the Explicit Path if a new path has to be established as shown in FIG. 6E.

If the EP is only comprised of strict hops, i.e. the entire path is fully given, then the MSRP application of core bridges 104 only have to install the proper Filter Database (FDB) entries after processing the EP descriptor (sub-TLV).

Figure 10A:
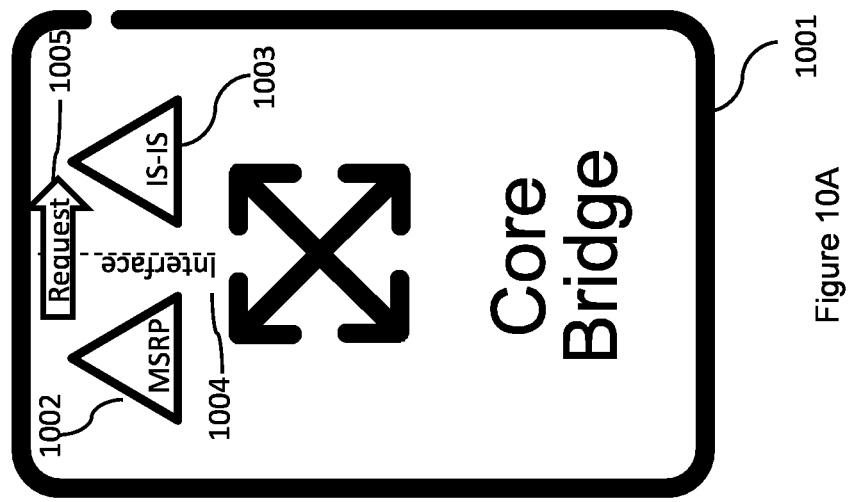
FIG. 10A is a block diagram illustrating a network node according to an embodiment, in which a MSRP application requests an IS-IS application to provide session routing information, for example a next hop.
Figure 10B:
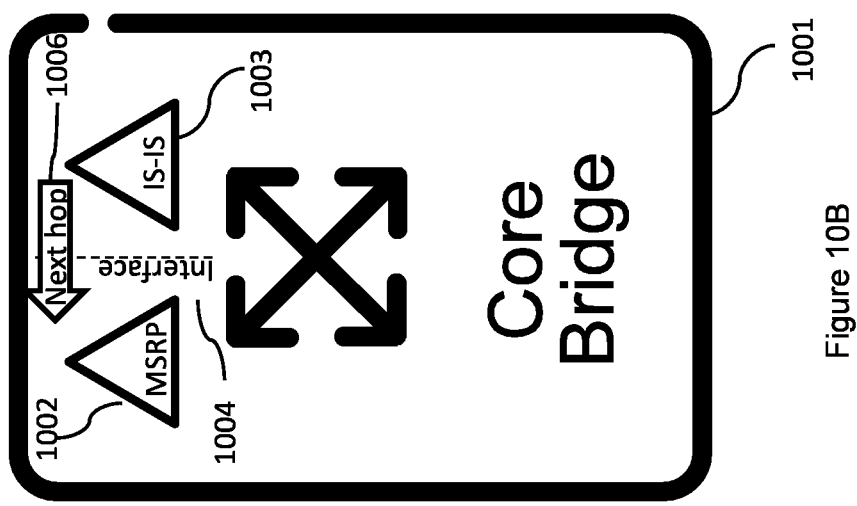
FIG. 10B is a block diagram illustrating a network node according to an embodiment, in which an IS-IS application provides the session routing information, for example a next hop, for a MSRP application request.

However, if the Explicit Path is not a fully strict path but also involves loose hops, i.e. Constrained Routing is required, then interaction is needed between the MSRP application 1002 and the IS-IS application 1003 of core bridges 104, 1001 as shown in FIGS. 10A and 10B. That is, after processing the MSRPDU 616 and retrieving the EP the MSRP application 1002 triggers 1005 the IS-IS application 1003, i.e. requests 1005 path computation from IS-IS for the loose hop. Having the computation done, the IS-IS application 1003 provides the next hop (006 for the MSRP application 1002 which is the adjacent neighbor bridge to which the MSRP application 1002 sends the MSRPDU 617 with the Listener Ready and EP information. In this case, IS-IS may install the proper FDB entries in the core bridge 104, 1001.

Finally, both the path establishment and the reservation is performed by MSRP in the network 601 and the Listener Ready gets to the Talker 608 as illustrated in FIG. 6F and described above.

Figure 13:
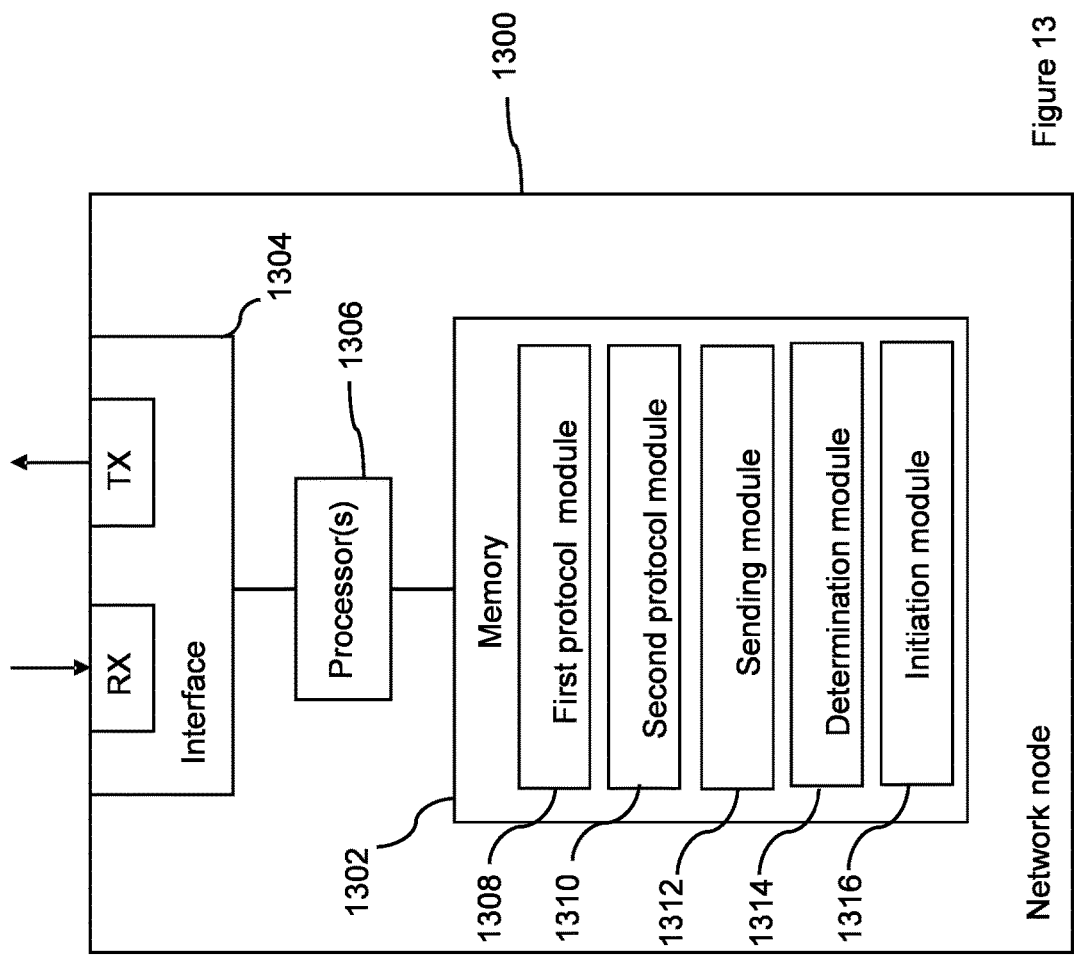
FIG. 13 is a block diagram illustrating a network node according to an embodiment.

In FIG. 13, a network node 1300 according to exemplary embodiment is described. The network node 1300 may be embodied as the edge bridge 405, 505, 605, 701, 801, 901, illustrated in the Figures above. The network node 1300 may be adapted to perform a method according to the embodiments mentioned above and below. In particular, the network node 1300 may be adapted to perform a method for interworking between a first protocol entity adapted to operate in accordance with a stream reservation protocol and a second protocol entity adapted to operate in accordance with a routing protocol for distributing information in a communication network. To this end, the network node 1300 may comprise corresponding program code stored, for example, in a memory 1302 of the network node 1300. The network node 1300 may also comprise a corresponding hardware structure, for example an interface 1304 for sending and receiving data in accordance with a stream reservation protocol for reserving resources for a data stream along a stream path of the data stream and/or a routing protocol for distributing information in a communication network, one or more processors 1306, and/or the memory 1302. The memory 1302 may include a read-only memory (ROM), for example, a flash ROM, a random access memory (RAM), for example, a dynamic RAM (DRAM) or static RAM (SRAM), a mass storage, for example a hard disk or solid state disk, or the like. TX refers to the sending capability of the interface 1304 and RX refers to the receiving capability of the interface 1304. The computer program code in the memory 1302 may comprise one or more modules for implementing respective method steps. The memory 1302 may comprise a first protocol module 1308 for implementing functionalities of a first protocol entity adapted to operate in accordance with the stream reservation protocol and a second protocol module 1310 for implementing functionalities of a second protocol entity adapted to operate in accordance with the routing protocol. A sending module 1312 may implement functionalities relating to sending, from the first protocol entity to the second protocol entity, a request for stream path information indicating, for a data stream to be sent, a stream path in the communication network. A determination module 1314 may implement functionalities related to determining, by the second protocol entity, the stream path information for the stream path based on the request. The sending module 1314 may further implement functionalities for sending, from the second protocol entity to the first protocol entity, the determined stream path information. Alternatively, a further sending module may be present for implementing the latter described functionality. An initiation module 1316 may implement functionalities for initiating, by the first protocol entity, a resource reservation procedure for reserving resources in response to receiving the stream path information. The memory 1302 may only comprise the modules 1312 to 1316 implementing the functionalities of the modules 1308, 1310, or may comprise only the modules 1308, 1310 implementing the functionalities of the modules 1312 to 1316. The memory 1302 may further comprise further modules for implementing the further steps of the method and/or common control functionalities of the network node 1300. Such modules can include, among others, one or more modules for implementing functionalities related to the determination in the steps S30, S32, S34 and/or S36, one or more modules implementing functionalities related to the sending in the steps S22, S38 and/or S39, a module for implementing functionalities related to the receiving in the step S40 and/or a module for implementing functionalities related to the keeping of the information in the step S22.

Figure 14:
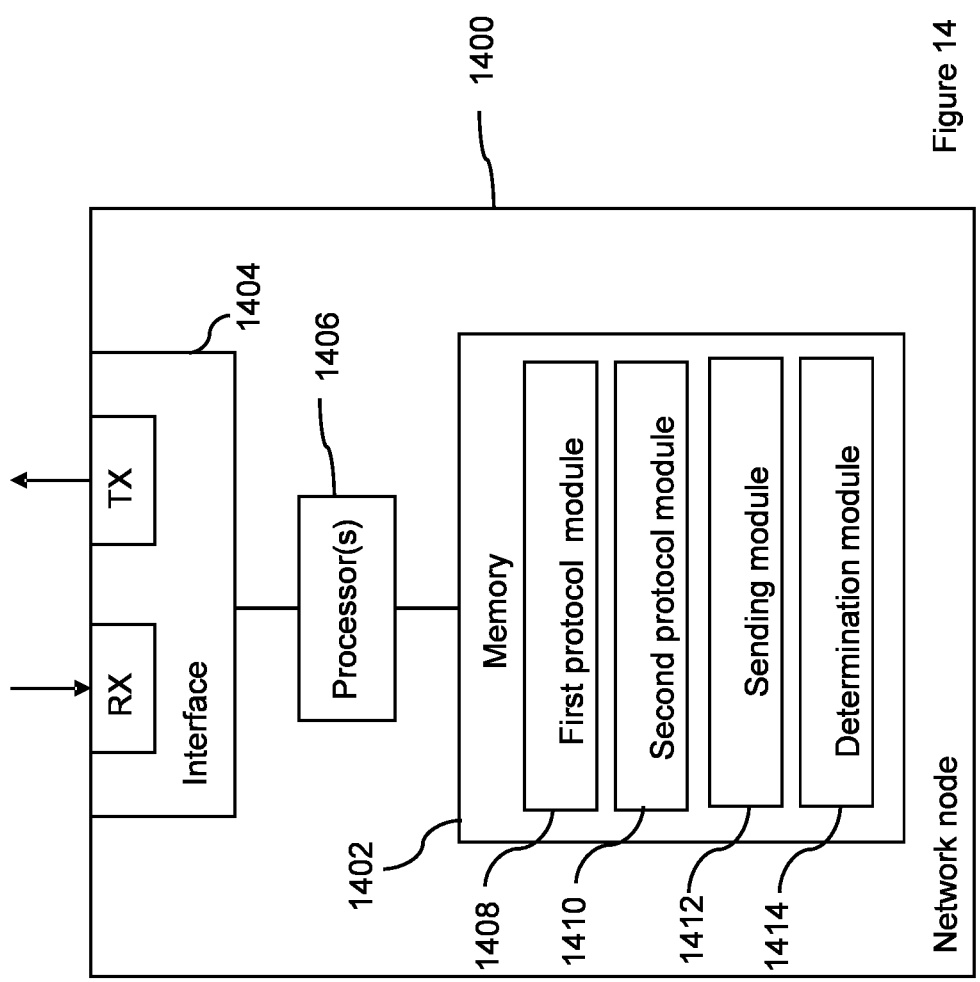
FIG. 14 is a block diagram illustrating a network node according to an embodiment.

In FIG. 14, a network node 1400 according to an exemplary embodiment is described. The network node 1400 may be embodied as the core bridge 104, 1001 illustrated in the Figures above. The network node 1400 may be adapted to perform a method according to the embodiments mentioned above and below. In particular, the network node 1400 may be adapted for or to perform a method for interworking between a first protocol entity adapted to operate in accordance with a stream reservation protocol and a second protocol entity adapted to operate in accordance with a routing protocol for distributing information in a communication network. To this end, the network node 1400 may comprise corresponding program code stored, for example, in a memory 1402 of the network node 1400. The network node 1400 may also comprise a corresponding hardware structure, for example an interface 1404 for sending and receiving data in accordance with a stream reservation protocol for reserving resources for a data stream along a stream path of the data stream and/or a routing protocol for distributing information in a communication network, one or more processors 1406, and/or the memory 1402. The memory 1402 may include a read-only memory (ROM), for example, a flash ROM, a random access memory (RAM), for example, a dynamic RAM (DRAM) or static RAM (SRAM), a mass storage, for example a hard disk or solid state disk, or the like. TX refers to the sending capability of the interface 1404 and RX refers to the receiving capability of the interface 1404. The computer program code in the memory 1402 may comprise one or more modules for implementing respective method steps. The memory 1402 may comprise a first protocol module 1408 for implementing functionalities of a first protocol entity adapted to operate in accordance with the stream reservation protocol and a second protocol module 1410 for implementing functionalities of a second protocol entity adapted to operate in accordance with the routing protocol. A sending module 1412 may implement functionalities relating to sending, from the first protocol entity to the second protocol entity, a request for stream path information indicating, for a data stream to be sent, a portion of a stream path in the communication network. A determination module 1414 may implement functionalities related to determining, by the second protocol entity, session path information indicating the portion of the session path. The sending module 1412 may further implement functionalities for sending, from the second protocol entity to the first protocol entity, the determined stream path information. Alternatively, a further sending module may be present for implementing the latter described functionality. The memory 1402 may only comprise the modules 1412, 1414 implementing the functionalities of the modules 1408, 1410, or may comprise only the modules 1408, 1410 implementing the functionalities of the modules 1412, 1414. The memory 1402 may further comprise further modules for implementing the further steps of the method and/or common control functionalities of the network node 1400. Such modules may include, among others, one or more modules for implementing functionalities related to the sending in the steps S56, S60 and/or S64, and/or one or mode modules implementing functionalities related to the receiving in the steps S62 and/or S58.

Figure 15:
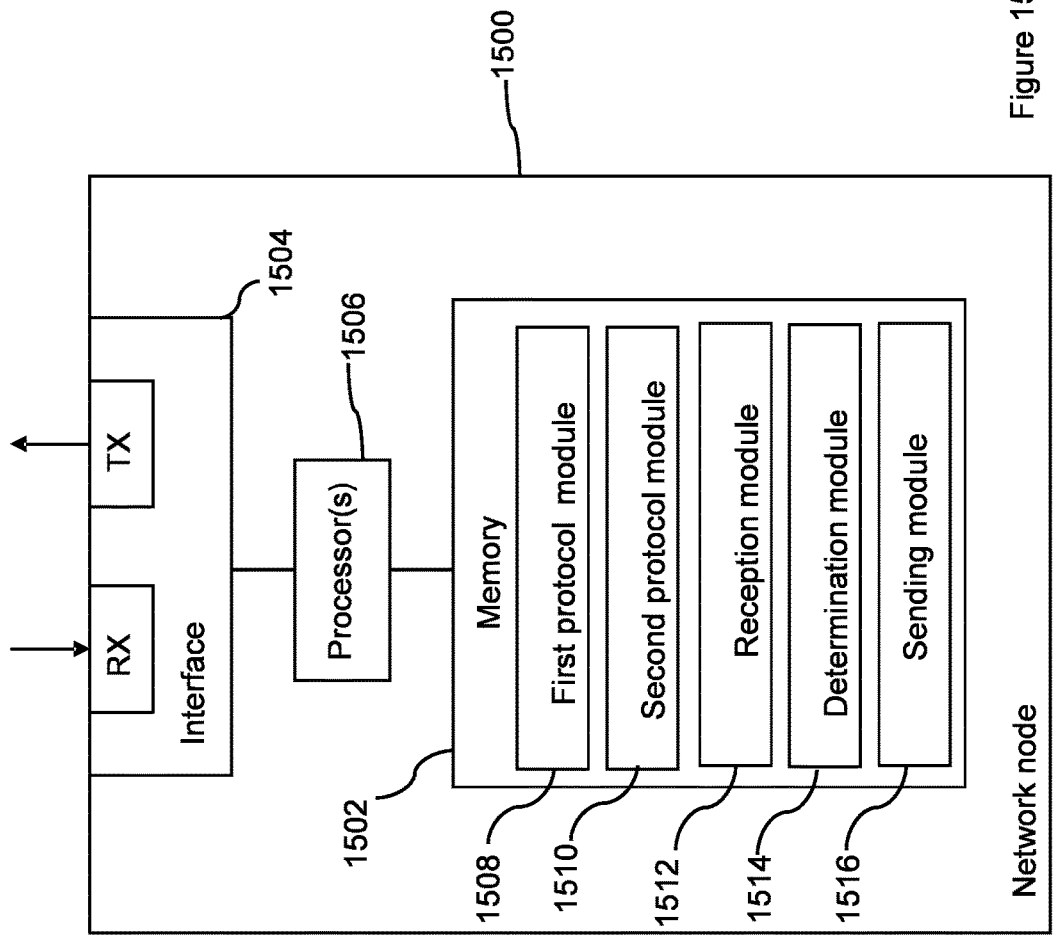
FIG. 15 is a block diagram illustrating a network node according to an embodiment.

In FIG. 15, a network node 1500 according to exemplary embodiment is described. The network node 1500 may be embodied as the edge bridge 405, 505, 605, 701, 801, 901 illustrated in the Figures above. The network node 1500 may be adapted to perform a method according to the embodiments mentioned above and below. In particular, the network node 1500 may be adapted for or to perform a method to be used in association with sending a data stream from a source of the data stream to a destination of the data stream. To this end, the network node 1500 may comprise corresponding program code stored, for example, in a memory 1502 of the network node 1500. The network node 1500 may also comprise a corresponding hardware structure, for example an interface 1504 for sending and receiving data in accordance with a stream reservation protocol for reserving resources for a data stream along a stream path of the data stream and/or a routing protocol for distributing information in a communication network, one or more processors 1506, and/or the memory 1502. The memory 1502 may include a read-only memory (ROM), for example, a flash ROM, a random access memory (RAM), for example, a dynamic RAM (DRAM) or static RAM (SRAM), a mass storage, for example a hard disk or solid state disk, or the like. TX refers to the sending capability of the interface 1504 and RX refers to the receiving capability of the interface 1504. The computer program code in the memory 1402 may comprise one or more modules for implementing respective method steps. The memory 1402 may comprise a first protocol module 1508 for implementing functionalities of a first protocol entity adapted to operate in accordance with the stream reservation protocol and a second protocol module 1510 for implementing functionalities of a second protocol entity adapted to operate in accordance with the routing protocol. A reception module 1512 may implement functionalities for receiving a request for registering in receiving the data stream from the source in a protocol data unit according to the stream reservation protocol. A determination module 1514 may implement functionalities for determining stream path information in response to the received request, the stream path information indicating, for a data stream to be sent, a stream path in a communication network. A sending module 1516 may implement functionalities for sending, in a first option, the determined stream path information in a protocol data unit according to a routing protocol or sending, in a second option, the determined stream path information in a protocol data unit according to the stream reservation protocol. In the first option, an identification of the stream path and/or a stream path description describing the stream path may be sent. In the second option, the stream path description may be sent. The memory 1502 may only comprise the modules 1512 to 1516 implementing the functionalities of the modules 1508, 1510, or may comprise only the modules 1508, 1510 implementing the functionalities of the modules 1512 to 1516. The memory 1502 may further comprise further modules for implementing the further steps of the method and/or common control functionalities of the network node 1500. For example, the memory 1502 may comprise one or more modules described with reference to FIG. 13.

Figure 16:
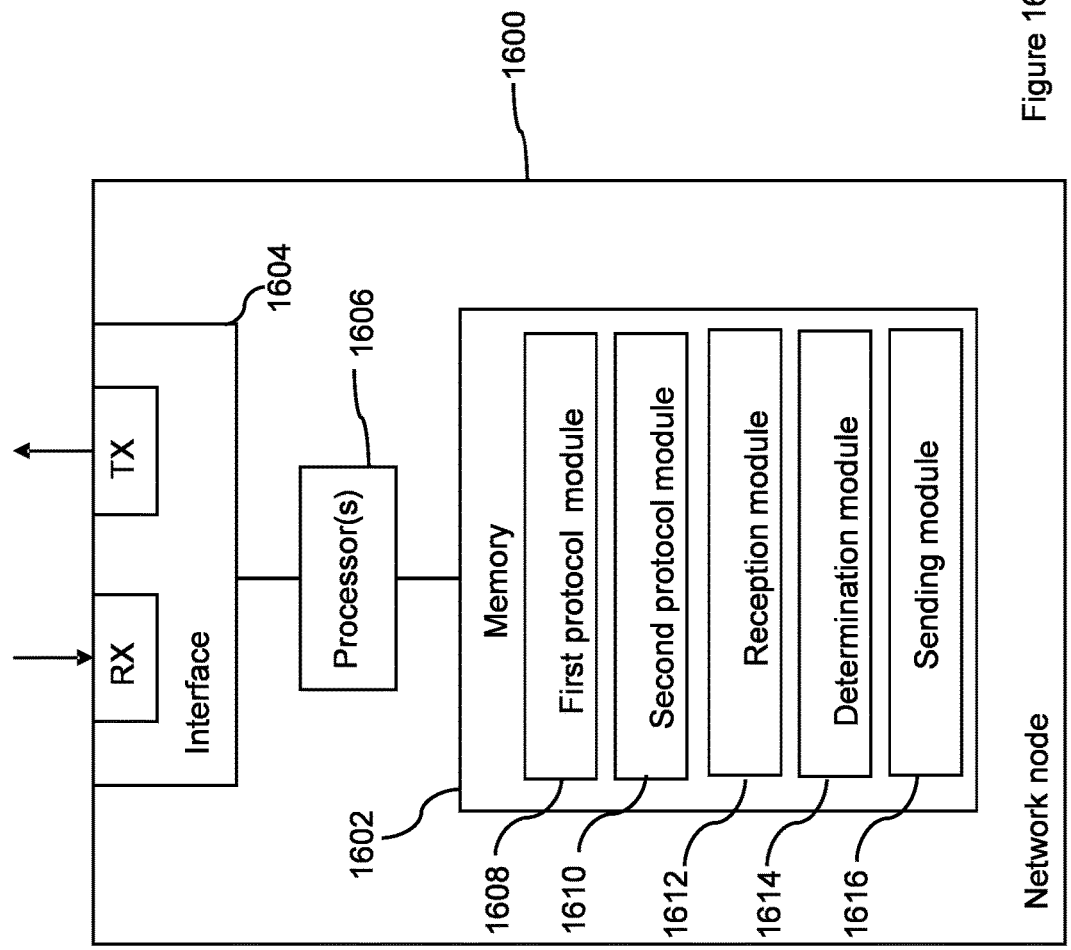
FIG. 16 is a block diagram illustrating a network node according to an embodiment.

In FIG. 16, a network node 1600 according to exemplary embodiment is described. The network node 1600 may be embodied as the core bridge 104, 1001 illustrated in the Figures above. The network node 1600 may be adapted to perform a method according to the embodiments mentioned above and below. In particular, the network node 1600 may be adapted for or to perform a method to be used in association with sending a data stream from a source of the data stream to a destination of the data stream. To this end, the network node 1600 may comprise corresponding program code stored, for example, in a memory 1602 of the network node 1600. The network node 1600 may also comprise a corresponding hardware structure, for example an interface 1604 for sending and receiving data in accordance with a stream reservation protocol for reserving resources for a data stream along a stream path of the data stream and/or a routing protocol for distributing information in a communication network, one or more processors 1606, and/or the memory 1602. The memory 1602 may include a read-only memory (ROM), for example, a flash ROM, a random access memory (RAM), for example, a dynamic RAM (DRAM) or static RAM (SRAM), a mass storage, for example a hard disk or solid state disk, or the like. TX refers to the sending capability of the interface 1604 and RX refers to the receiving capability of the interface 1604. The computer program code in the memory 1602 may comprise one or more modules for implementing respective method steps. The memory 1602 may comprise a first protocol module 1608 for implementing functionalities of a first protocol entity adapted to operate in accordance with the stream reservation protocol and a second protocol module 1610 for implementing functionalities of a second protocol entity adapted to operate in accordance with the routing protocol. A reception module 1612 may implement functionalities for receiving a stream path description describing the stream path in a protocol data unit according to the stream reservation protocol. A determination module 1614 may implement functionalities for determining stream path information based on the received stream path description, the stream path information indicating, for a data stream to be sent, a portion of the stream path in a communication network. A sending module 1616 may implement functionalities for sending, in accordance with the determined stream path information, the stream path description in a protocol data unit according to the stream reservation protocol. The memory 1602 may only comprise the modules 1612 to 1616 implementing the functionalities of the modules 1608, 1610, or may comprise only the modules 1608, 1610 implementing the functionalities of the modules 1612 to 1616. The memory 1602 may further comprise further modules for implementing the further steps of the method and/or common control functionalities of the network node 1600. For example, the memory 1602 may comprise one or more modules described with reference to FIG. 14.

In the following, embodiments of the present disclosure will be described.

1. A method embodiment for interworking between a first protocol entity adapted to operate in accordance with a stream reservation protocol for reserving resources for a data stream along a stream path of the data stream and a second protocol entity adapted to operate in accordance with a routing protocol for distributing information in a communication network, the method comprising:

sending, from the first protocol entity to the second protocol entity, a request for stream path information indicating, for a data stream to be sent, a stream path in the communication network, determining, by the second protocol entity, the stream path information for the stream path based on the request, sending, from the second protocol entity to the first protocol entity, the determined stream path information, and initiating, by the first protocol entity, a resource reservation procedure for reserving resources in response to receiving the stream path information.

The stream reservation protocol may enable a reservation of the resources, for example bandwidth etc, in or within the communication network.

2. The method according to the previous embodiment, wherein the stream path information may comprise an identification of the stream path, for example an identifier of the stream path.

The identification may be unique in the communication network such that the stream path can be individually addressed by network nodes of the communication network.

3. The method according to any previous embodiment, wherein the stream path of the determined stream path information may correspond to an explicit stream path in the communication network.

In this respect, the term "explicit stream path" may relate to a stream path which may be determined, for example by means of computation, by a single entity for example a protocol entity of a network node. For example, the explicit path may be determined upon request from another entity such as the first protocol entity. In contrast, a non-explicit stream path may be determined, for example by means of computation, in a distributed fashion by several entities, for example respective protocol entities of several network nodes, which may establish or install the stream path autonomously, hence independent of each other. For example, in the routing protocol such as IS-IS, the second protocol entities, particularly all second protocol entities involved, comprise a similar or identical database with respect to a content thereof, such that the entities, particularly all entities involved, may run "Dijkstra" locally and may install the outcome, such that the non-explicit stream path may be finally set up. The explicit stream path may be referenced in this application as "EP".

4. The method according to any previous embodiment, wherein the step of determining comprises:

determining, by the second protocol entity, whether a stream path for the data stream is already established in the network, the already established stream path fulfilling at least one condition for the data stream to be sent particularly from a source of the data stream to a destination of the data stream, wherein the stream path information indicates the already established stream path if the stream path fulfilling the at least one condition is already established.

The already established stream path may be an explicit or non-explicit stream path. Further, the latter categories for a stream path might not apply to the already established stream path in that the stream path may be already present or existing the communication network without further determination of the latter.

The at least one condition may relate to a quality of service characteristic of the data stream to be sent from the source to the destination or a transmission characteristic for the data stream to be sent from the source to the destination.

The quality of service characteristic may be at least one characteristic selected from a group consisting of, for example, a delay, a delay variation, a loss, a loss ratio, etc.

The transmission characteristic may be a bandwidth etc.

5. The method according to any previous embodiment, wherein the step of determining comprises:

determining, for the data stream to be sent, a new stream path in the communication network, wherein the determined stream path information indicate the new stream path.

The step of determining the new stream path may be performed subsequent to the step of determining whether a stream path for the data stream may be already established in the communication network. For example, the step of determining the new stream path may be, particularly only, triggered if it may be previously determined that no stream path for the data stream may be already established in the communication network.

The step of determining the new stream path may comprise computing the new stream path.

6. The method according to any previous embodiment, wherein the step of determining the new stream path is performed using network topology information in the second protocol entity, the network topology information describing at least a portion of the communication network or the complete communication network.

Such network topology information may comprise information about potential hops in the communication network and/or information about links between two hops in the communication network.

The step of determining may be performed using a metric such as costs required for establishing the stream path in the communication network. In this respect, the term "costs" may relate to an effort to establish the stream path and may be measured in, for example, device and/or network resources, processing capacities of one or more devices, money for the processing and/or network resources, a number and/or or kind of hops along the stream path, a number and/or kind of links along the stream path, etc. The determination of the new path may be performed by minimizing the costs for establishing the new stream path. The determination may also take into account routing constraints defined for the data stream, such as the above mentioned quality of service characteristic and/or transmission characteristic. The latter may be referenced in this application by "Constrained Routing". The stream path associated with the costs being minimized, optionally by taking into account the routing constraints, may correspond to the "shortest stream path". In particular, the shortest stream path may be different from the stream path having the less physical length. A stream path being different from the shortest stream path may correspond to a more complex or complicated stream path and may be referenced by the term "non-shortest stream path". The shortest stream path may represent a sort of default stream path and/or may be present in the communication network if a second protocol entity may be used. Additionally or alternatively, the shortest stream path may be determined without being requested to be determined.

7. The method according to any previous embodiment, the method further comprising:
   initiating, by the second protocol entity, an establishment of the new stream path in the communication network by sending the determined stream path information in a protocol data unit according to the routing protocol over the communication network.

The protocol data unit may be embodied as a Link State Data Packet Unit (PDU) (LSP).

8. The method according to any previous embodiment, the method further comprising:
   determining, by the second protocol entity, whether the new stream path is successfully established in the network,
   wherein the step of sending the determined stream path information from the second protocol entity to the first protocol entity is performed if the new stream path is successfully established and else anew determining whether the new stream path is successfully established in the communication network.

Hence, this measure may introduce a determination loop in the second protocol entity such that the second protocol entity may wait until the new stream path is successfully established and may then further proceed to the step of sending the stream path information to the first protocol entity.

In a case in which the aforementioned determination might be not in the affirmative, the second protocol entity may send feedback information to the first protocol entity. This feedback information may indicate that the new stream path may be unsuccessfully established.

The first protocol entity may deduce from the receipt of the stream path information and/or from the received stream path information that the stream path is successfully established.

9. The method according to any previous embodiment, the method further comprising:
   sending, from the second protocol entity to the first protocol entity, an establishment indication indicating the successful establishment of the new stream path.

This measure may be performed in addition or alternatively to the aforementioned deduction of the successfulness of the establishment of the new stream path by the first protocol entity. The establishment indication may be embodied as "Ready" information.

The stream path information and the establishment information may be sent together in one message or signaling exchange or may be sent separately. The stream path information may comprise the establishment information or the establishment information may comprise the stream path information.

10. The method according to any one of embodiments 1 to 6, wherein the stream path information sent between the second protocol entity and the first protocol entity further comprises a stream path description describing the new stream path.

The stream path description may specify the, particularly complete, stream path to be used for the data stream. For example, the stream path may be completely specified in terms of defining hops along the stream path in the communication network or may be not completely or loosely specified in terms of specifying not all hops along the stream path in the communication network.

11. The method according to any previous embodiment, wherein the stream path of the determined stream path information may correspond to a shortest stream path or a non-shortest stream path.

Hence, according to some embodiments an explicit stream path may be indicated in the determined stream path information. The (explicit) stream path indicated in the stream path information may be either the already established stream path fulfilling the at least one condition or the new stream path. The already established stream path may be the shortest stream path or a non-shortest stream path. The new stream path may be also the shortest stream path or the non-shortest stream path. In the latter case, the second protocol entity may initiate to establish the new determined stream path and in some embodiments the first protocol entity may instruct the establishment of the new stream path.

12. The method according to any previous embodiment, wherein the step of initiating comprises:
   sending, by the first protocol entity, an instruction for reserving resources in the communication network in a data packet unit according to the stream reservation protocol particularly based on the stream path information.

Hence, the involved first protocol entity may be enabled to reserve the resources.

The data packet unit may be embodied as a MSRPDU.

The data packet unit may further comprise information indicating that the destination may be capable of receiving the data stream, particularly a so called "Lister Ready" or "Listener Ready" information.

13. The method according to embodiment 12, wherein the data packet unit further comprises the identification of the stream path.

Therefore a further network node may be enabled to associate the received data packet unit and the content thereof with a data stream upon receipt of the data packet unit. Such a network node may correspond to an intermediate network node in the communication network. The further network node may send the received data packet unit to the proper next hop network node if the stream path may be already established. To this end, the further network node may comprise information about a stream destination address, for example a Stream Destination Address (DA), for each data stream, and information about a VLAN ID (VID) of a VLAN to which the data stream may belong. The forwarding in the further network element may be based on the VID and DA. In the case in which the stream path may be already established, for example because the stream path has been already previously established, hence is already existing in the communication network, or the new stream path has been successfully established as initiated by the second protocol entity, then the forwarding of the data packet unit may be already installed in the network node and may follow the above described forwarding. Therefore the data packet unit may be directed to its proper destination.

14. The method according to embodiment 12 or 13, wherein the data packet unit further comprises the stream path description.

Therefore the further network node may be enabled for packet forwarding in the case in which the new stream path may be determined but not established for example in terms of the VID and DA. A respective first entity of the further network node may initiate the determination of the next hop for the data packet unit based on the description of the stream path. The latter procedure in the further network node may be described in the following with reference to the embodiment 18 and/or 19.

15. The method according to any previous embodiment, wherein the step of sending the request from the first protocol entity to the second protocol entity is performed in response to receiving, from the destination, a request for registering in receiving the data stream from the source, particularly the Listener Ready information.

In particular, the request for registering in receiving the data stream and the aforementioned information may be identical to one another, for example in that the respective information comprise the same content but may serve for different functionalities depending on its utilization in the communication network.

16. The method according to embodiment 15, the method further comprising:
    keeping, by the first protocol entity, particularly all, information received in the request for registering in receiving the data stream from the source until having received the stream path information from the second protocol entity.

In particular, the above mentioned feedback information indicating the unsuccessful establishment of the new stream path may not trigger the sending of the, particularly all, information received in the request for registering in the receiving of the data stream.

17. The method according to any previous embodiment, wherein the stream reservation protocol and the routing protocol form a protocol stack in a network node which is located adjacent to the destination.

The first protocol entity and/or the second protocol entity may be adapted as an application.

The stream reservation protocol may be embodied as a MSRP, and the first protocol entity may be embodied as MSRP entity. A data packet unit according to this protocol may be embodied as a MSRPDU.

The routing protocol may be embodied as an IS-IS protocol, and the second protocol entity may be embodied as IS-IS protocol entity. A data packet unit according to the routing protocol may be embodied as a LSP.

18. A method embodiment for interworking between a first protocol entity adapted to operate in accordance with a stream reservation protocol for reserving resources for a data stream along a stream path of the data stream and a second protocol entity adapted to operate in accordance with a routing protocol for distributing information in a communication, the method comprising:
    sending, from the first protocol entity to the second protocol entity, a request for stream path information indicating, for a data stream to be sent, a portion of a stream path in the communication network,
    determining, by the second protocol entity, session path information indicating the portion of the session path, and
    sending, from the second protocol entity to the first protocol entity, the determined stream path information.

The determined stream path information may comprise an identification and/or a description of the portion of the stream path.

19. The method according to embodiment 18, the method further comprising:
    sending, from the first protocol entity to the second protocol entity, a stream path description describing the stream path.

The stream path description may correspond to the stream path description of the new stream path explained above. The step of sending the stream path description may be performed in response to receiving, by the first protocol entity the stream path description of the (new) stream path particularly from a further first protocol entity of a network node, for example an edge network node adjacent to a destination of the data stream to be sent. The stream path description of the (new) stream path and the request for the stream path may be sent together in one information exchange or message.

The determined session path information may indicate a next hop and/or a next link along the session path.

The method may further comprise receiving, by the first protocol entity, an instruction for reserving resources along the stream path. The instruction for reserving the resources may correspond to the instruction explained with reference to embodiment 12. The instruction for reserving resources may be received from an or the further first protocol entity of an or the network node, respectively. The step of sending the request for the session path information may be performed in response the receiving the instruction.

The instruction for reserving resources and/or the stream path information describing the stream path may be received in an or same protocol data unit according to the stream reservation protocol. The data packet unit may also comprise an identification of the stream path and/or information that the destination may be capable of receiving the data stream, for example the information indicating that the destination is capable of receiving the data stream.

The method further comprising sending, by the first protocol entity, the instruction for reserving resources, the stream path description describing the stream path, the stream path description describing the portion of the stream path, the identification of the portion of the stream path, the identification of the stream path, and/or the information indicating that the destination is capable of receiving the data stream, particularly to another network node or to the source of the data stream, in a data packet unit according to the stream reservation protocol based on the received determined session path information.

For example, the MSRP application receives the descriptor of the EP in the MSRPDU. The MSRP application then sends the EP sub-TLV to the IS-IS application. The IS-IS application can determine the missing segment of the stream path for the loose hop by means of computation, because the IS-IS application has knowledge of the network topology. The IS-IS application may run Dijkstra for this computation.

20. A method embodiment for sending a data stream from a source of the data stream to a destination of a data stream, the method comprising:
    sending, by the source, a data stream announcement to a communication network,
    sending, by the destination, a request for registering in receiving the data stream from the source to a first protocol entity adapted to operate in accordance with a stream reservation protocol along a stream path of the data stream based on the received data stream announcement, the method further comprising the method according to any one of embodiments 1 to 17, and:
    sending the data stream from the source to the destination using reserved resources in accordance with an initiated resource reservation procedure.

The data stream announcement may be sent from the source to the communication network in a data packet unit according to the stream reservation protocol.

The data stream announcement may be sent through the communication network to the destination.

The step of sending the data stream may use all resources reserved in the communication network according to the stream reservation procedure or may use a portion of the reserved resources.

21. The method according to embodiment 20, the method further comprising the method according to embodiment 18 or 19.

22. The method according to embodiment 20 or 21, the method may further comprising:
   sending the data stream announcement through at least a portion of the communication network in a data packet unit according to the stream reservation protocol and/or a data packet unit according to the routing protocol.

The data packet unit according to the stream reservation protocol may be the data packet unit sent by the source, hence the data packet unit is forwarded.

For example, the data stream announcement may be sent from the source to a network node adjacent to the source in a data packet according to the stream reservation protocol. The network node may translate the received data packet unit into a data packet unit according to the routing protocol. Thereupon the network node may send the received data packet unit and/or the translated data packet unit to a further network node, particularly a further network node adjacent to the destination of the data stream. Translation of the received data packet unit may be performed using a respective first protocol entity of the network node, the first protocol entity being adapted to operate in accordance with the stream reservation protocol, and/or a second protocol entity of the network node, the second protocol entity being adapted to operate in accordance with the routing protocol. The latter description of translating may also apply for any intermediate network node between a network node adjacent to the source and the network node adjacent to the destination.

The data stream may be sent from the source to the destination at least along the stream path and optionally along one or more further different stream paths. Hence, the complete data stream path from the source to the may be embodied as a tree. For example, protection operations for the data stream, such as protection scheme based operations, can be performed, for example by the source, the destination and one or more network in the communication network. In this respect, the term "protection operations" and in particular "protection scheme" may refer to measures for ensuring a correct provision or an identical provision of the data stream from the source to one or more destinations along more than one stream paths. The provision may be for example accomplished in a simultaneous way, for example by means of duplication of the data stream, or in a sequence, for example along one stream path and later along a further stream path.

The data stream may be sent from the source to at least a further destination. Hence, the complete stream path may be also embodied as a tree. Protection operations explained above may also be performed. The at least further destination may send a request for registering in receiving the data stream to the network node or to a further network node, in which a corresponding method according to any one of embodiments 1 to 17 is performed.

23. A method embodiment for sending a data stream from a source of the data stream to a destination of a data stream, the method comprising:
   sending, by the source, a data stream announcement to a communication network,
   sending the data stream announcement through at least a portion of the communication network in a data packet unit according to a stream reservation protocol and/or a data packet unit according to a routing protocol,
   sending, by the destination, a request for registering in receiving the data stream from the source to a network node based on the received data stream announcement, and
   sending the data stream from the source to the destination based on the request in registering in receiving the data stream.

24. A method embodiment for sending a data stream from a source of the data stream to a destination of a data stream, the method comprising:
   sending, by the source, a data stream announcement to a communication network,
   sending, by the destination, a request for registering in receiving the data stream from the source to a network element based on the received data stream announcement, the method further comprising the method according to embodiment 18 or 19 and:
   sending the data stream from the source to the destination based on the determined stream path information.

25. A method embodiment to be used in association with sending a data stream from a source of the data stream to a destination of a data stream, the method comprising:
   receiving a request for registering in receiving the data stream from the source in a protocol data unit according to a stream reservation protocol for reserving resources for the data stream along the stream path,
   determining stream path information in response to the received request, the stream path information indicating, for a data stream to be sent, a stream path in a communication network, and
   sending the determined stream path information, particularly an identification of the stream path, in a protocol data unit according to a routing protocol or sending the determined stream path information, particularly a stream path description describing the stream path, in a protocol data unit according to the stream reservation protocol.

The method may be performed by a system according to embodiment 27 or a network node according to embodiment 30.

26. A method embodiment to be used in association with sending a data stream from a source of the data stream to a destination of a data stream, the method comprising:
   receiving a stream path description describing the stream path in a protocol data unit according to a stream reservation protocol for reserving resources for the data stream along the stream path,
   determining stream path information based on the received stream path description, the stream path information indicating, for a data stream to be sent, a portion of the stream path in a communication network, and
   sending, in accordance with the determined stream path information, the stream path description in a protocol data unit according to the stream reservation protocol.

The method may be performed by a system according to embodiment 28 or a network node according to embodiment 31.

27. A system embodiment for interworking between a first protocol entity adapted to operate in accordance with a stream reservation protocol for reserving resources for a data stream along a stream path of the data stream and a second protocol entity adapted to operate in accordance with a routing protocol for distributing information in a communication network, the system comprising the first protocol entity and the second protocol entity, the system being adapted to:

send, from the first protocol entity to the second protocol entity, a request for stream path information indicating, for a data stream to be sent, a stream path in the communication network, determine, by the second protocol entity, the stream path information for the stream path based on the request, send, from the second protocol entity to the first protocol entity, the determined stream path information, and initiate, by the first protocol entity, a resource reservation procedure for reserving resources in response to receiving the stream path information.

The system may be adapted to perform a method according to embodiment 2 to 17.

28. A system embodiment for interworking between a first protocol entity adapted to operate in accordance with a stream reservation protocol for reserving resources for a data stream along a stream path of the data stream and a second protocol entity adapted to operate in accordance with a routing protocol for distributing information in a communication, the system comprising the first protocol entity and the second protocol entity, the system being adapted to:

send, from the first protocol entity to the second protocol entity, a request for stream path information indicating, for a data stream to be sent, a portion of a stream path in the communication network, determine, by the second protocol entity, session path information indicating the portion of the session path, and send, from the second protocol entity to the first protocol entity, the determined stream path information.

The system may be adapted to perform a method according to embodiment 19

29. A network node embodiment or interworking between a first protocol entity adapted to operate in accordance with a stream reservation protocol for reserving resources for a data stream along a stream path of the data stream and a second protocol entity adapted to operate in accordance with a routing protocol for distributing information in a communication, the network node comprising the system according to embodiment 27 or 28.

The network node may be adapted as an edge network node or as an intermediate network node, particularly both as explained above. The network node may be adapted for a communication system for sending a data stream from a source of the data stream to a destination of a data stream. The network node may be adapted to perform a method according to any one or embodiments 1 to 19.

30. A network node embodiment to be used in association with sending a data stream from a source of the data stream to a destination of a data stream, the network node being adapted to:

receive a request for registering in receiving the data stream from the source in a protocol data unit according to a stream reservation protocol for reserving resources for the data stream along the stream path, determine stream path information in response to the received request, the stream path information indicating, for a data stream to be sent, a stream path in a communication network, and send the determined stream path information, particular an identification of the stream path, in a protocol data unit according to a routing protocol or sending the determined stream path information, particularly a stream path description describing the stream path, in a protocol data unit according to the stream reservation protocol.

31. A network node embodiment to be used in association with sending a data stream from a source of the data stream to a destination of a data stream, the network node comprising:

receive a stream path description describing the stream path in a protocol data unit according to a stream reservation protocol for reserving resources for the data stream along the stream path, determine stream path information based on the received stream path description, the stream path information indicating, for a data stream to be sent, a portion of the stream path in a communication network, and send, in accordance with the determined stream path information, the stream path description in a protocol data unit according to the stream reservation protocol.

32. A communication system embodiment for sending a data stream from a source of the data stream to a destination of a data stream, the communication system comprising at least one of the system according to embodiment 27 or 28 or at least one network node according to embodiment 30 or 31.

33. A communication system embodiment for sending a data stream from a source of the data stream to a destination of a data stream, the communication system comprising a source and a destination and a communication network, the communication system being adapted to:

send, by the source, a data stream announcement to a communication network, send, by the destination, a request for registering in receiving the data stream from the source to a first protocol entity adapted to operate in accordance with a stream reservation protocol along a stream path of the data stream based on the received data stream announcement, the communication system being further adapted to perform the method according to any one of embodiments 1 to 17, and:

send the data stream from the source to the destination using reserved resources in accordance with an initiated resource reservation procedure.

The communication system may be adapted to perform a method according to embodiment 18 or 19

34. A communication system embodiment for sending a data stream from a source of the data stream to a destination of a data stream, the communication system comprising the source and the destination and a communication network, the communication system being adapted to:

send, by the source, a data stream announcement to a communication network, send the data stream announcement through at least a portion of the communication network in a data packet unit according to a stream reservation protocol and/or a data packet unit according to a routing protocol, send, by the destination, a request for registering in receiving the data stream from the source to a network node based on the received data stream announcement, and send the data stream from the source to the destination based on the request in registering in receiving the data stream.

35. A communication system embodiment for sending a data stream from a source of the data stream to a destination of a data stream, the communication system comprising the source, the destination and a communication network, the communication system being adapted to:

send, by the source, a data stream announcement to a communication network, send, by the destination, a request for registering in receiving the data stream from the source to a network element based on the received data stream announcement, the communication system being further adapted to perform the method according to embodiment 18 or 19 and:

send the data stream from the source to the destination based on the determined stream path information.

36. A computer program embodiment, which, when being executed by at least one processor, causes a method according to any one of embodiments 1 to 19 to be performed.

37. A computer program product embodiment, comprising program code to be executed by at least one processor, thereby causing a method according to any one of embodiments 1 to 19 to be performed.

Modifications and other embodiments of the disclosed embodiments will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation. The description of the embodiments with reference to 3GPP may not exclude the described embodiments being applicable in other communication networks and/or technologies, the networks and/or technologies being different from the mentioned protocols.

The invention claimed is:

1. A method for interworking between a first protocol entity adapted to operate in accordance with a stream reservation protocol for reserving resources for a data stream along a stream path of the data stream and a second protocol entity adapted to operate in accordance with a routing protocol for distributing information in a bridge network, wherein the stream reservation protocol and the routing protocol form a protocol stack in a network node, the method comprising:

sending, from the first protocol entity to the second protocol entity via an interface between the first and the second protocol entities, a request for stream path information indicating, for a data stream to be sent, a stream path in the bridge network, determining, by the second protocol entity, which controls the bridge network based on Layer 2 add-ons, the stream path information for the stream path based on the request, wherein the second protocol entity stores network topology information, and the step of determining stream path information is performed by locally processing the network topology information according to Dijkstra's algorithm using the Layer 2 add-ons, sending, from the second protocol entity to the first protocol entity, the determined stream path information, and initiating, by the first protocol entity, a resource reservation procedure for reserving resources in response to receiving the stream path information.

2. The method of claim 1, wherein the stream path information comprises an identification of the stream path.

3. The method of claim 1, wherein the stream path of the determined stream path information corresponds to an explicit stream path in the bridge network.

4. The method of claim 1, wherein the step of determining comprises:

determining, by the second protocol entity, whether a stream path for the data stream is already established in the bridge network, the already established stream path fulfilling at least one condition for the data stream to be sent from a source of the data stream to a destination of the data stream, wherein the stream path information indicates the already established stream path, if the stream path fulfilling the at least one condition is already established.

5. The method of claim 1, wherein the step of determining comprises:

determining, for the data stream to be sent, a new stream path in the bridge network, wherein the determined stream path information indicate the new stream path.

6. The method of claim 1, wherein the step of determining the stream path information is performed using network topology information in the second protocol entity, the network topology information describing at least a portion of the bridge network or the complete bridge network.

7. The method of claim 1, the method further comprising: initiating, by the second protocol entity, an establishment of the stream path in the bridge network by sending the determined stream path information in a protocol data unit according to the routing protocol over the bridge network or by sending the determined stream path information in a protocol data unit according to the routing protocol to a network node of the bridge network.

8. The method of claim 1, the method further comprising:

determining, by the second protocol entity, that an established stream path does not satisfy an acceptance criterion specified in the request for stream path information;

wherein the step of determining the stream path information comprises determining a new stream path; and wherein the step of sending the determined stream path information from the second protocol entity to the first protocol entity comprises sending information indicating the new stream path.

9. The method of claim 1, the method further comprising: sending, from the second protocol entity to the first protocol entity, an establishment indication indicating the successful establishment of the stream path.

10. The method of claim 1, wherein the stream path information comprises a stream path description describing the stream path, the method further comprising:

initiating, by the first protocol entity, an establishment of the stream path in the bridge network by sending the determined stream path information in a protocol data unit according to the stream reservation protocol.

11. The method of claim 1, wherein the stream path of the determined stream path information corresponds to a shortest stream path or a non-shortest stream path.

12. The method of claim 1, wherein the step of initiating the resource reservation procedure comprises:

sending, by the first protocol entity, an instruction for reserving resources in the bridge network in a data packet unit according to the stream reservation protocol based on the stream path information.

13. The method of claim 2, wherein the data packet unit further comprises the identification of the stream path.

14. The method of claim 2, wherein the data packet unit further comprises the stream path description.

15. The method of claim 1, wherein the step of sending the request from the first protocol entity to the second protocol entity is performed in response to receiving, from the destination, a request for registering in receiving the data stream from the source.

16. The method of claim 15, the method further comprising:
keeping, by the first protocol entity information received in the request for registering in receiving the data stream from the source until having received the stream path information from the second protocol entity.

17. The method of claim 1, wherein said network node is located adjacent to the destination.

18. A method for interworking between a first protocol entity adapted to operate in accordance with a stream reservation protocol for reserving resources for a data stream along a stream path of the data stream and a second protocol entity adapted to operate in accordance with a routing protocol for distributing information in a bridge network, wherein the stream reservation protocol and the routing protocol form a protocol stack in a network node, the method comprising:
sending, from the first protocol entity to the second protocol entity via an interface between the first and the second protocol entities, a request for stream path information indicating, for a data stream to be sent, a portion of a stream path in the bridge network,
determining, by the second protocol entity, which controls the bridge network based on Layer 2 add-ons, stream path information indicating the portion of the stream path, wherein the second protocol entity stores network topology information, and the step of determining stream path information is performed by locally processing the network topology information according to Dijkstra's algorithm using the Layer 2 add-ons, and
sending, from the second protocol entity to the first protocol entity, the determined stream path information.

19. The method of claim 18, the method further comprising: sending, from the first protocol entity to the second protocol entity, a stream path description describing the stream path.

20. A system for interworking between a first protocol entity adapted to operate in accordance with a stream reservation protocol for reserving resources for a data stream along a stream path of the data stream and a second protocol entity adapted to operate in accordance with a routing protocol for distributing information in a bridge network, the system comprising the first protocol entity and the second protocol entity and wherein the stream reservation protocol and the routing protocol form a protocol stack in a network node, the system being adapted to:
send, from the first protocol entity to the second protocol entity via an interface between the first and the second protocol entities, a request for stream path information indicating, for a data stream to be sent, a stream path in the bridge network,
determine, by the second protocol entity, which controls the bridge network based on Layer 2 add-ons, the stream path information for the stream path based on the request, wherein the second protocol entity stores network topology information, and the step of determining stream path information is performed by locally processing the network topology information according to Dijkstra's algorithm using the Layer 2 add-ons,
send, from the second protocol entity to the first protocol entity, the determined stream path information, and
initiate, by the first protocol entity, a resource reservation procedure for reserving resources in response to receiving the stream path information.

21. A system for interworking between a first protocol entity adapted to operate in accordance with a stream reservation protocol for reserving resources for a data stream along a stream path of the data stream and a second protocol entity adapted to operate in accordance with a routing protocol for distributing information in a bridge network, the system comprising the first protocol entity and the second protocol entity and wherein the stream reservation protocol and the routing protocol form a protocol stack in a network node, the system being adapted to:
send, from the first protocol entity to the second protocol entity, via an interface between the first and the second protocol entities, a request for stream path information indicating, for a data stream to be sent, a portion of a stream path in the bridge network,
determine, by the second protocol entity, which controls the bridge network based on Layer 2 add-ons, stream path information indicating the portion of the stream path, wherein the second protocol entity stores network topology information, and the step of determining stream path information is performed by locally processing the network topology information according to Dijkstra's algorithm using the Layer 2 add-ons, and
send, from the second protocol entity to the first protocol entity, the determined stream path information.

22. The system of claim 21, wherein the system is further adapted to send, from the first protocol entity to the second protocol entity, a stream path description describing the stream path.

23. The method of claim 1, further comprising:
transmitting, by the second protocol entity, a link state data packet unit (LSP) to a second node in the bridge network, the LSP comprising an indication of the determined stream path information.

24. The method of claim 1, wherein the second protocol entity is adapted to operate in accordance with an Intermediate System to Intermediate System (IS-IS) routing protocol.

25. The system of claim 20, wherein the system is further adapted to: transmit, from the second protocol entity, a link state data packet unit (LSP) to a second node in the bridge network, the LSP comprising an indication of the determined stream path information.

26. The system of claim 20, wherein the second protocol entity is adapted to operate in accordance with an Intermediate System to Intermediate System (IS-IS) routing protocol.

\* \* \* \* \*